US010366699B1

(12) United States Patent
Dharia et al.

(10) Patent No.: US 10,366,699 B1
(45) Date of Patent: Jul. 30, 2019

(54) MULTI-PATH CALCULATIONS FOR DEVICE ENERGY LEVELS

(71) Applicant: Amazon Technologies, Inc., Seattle, WA (US)

(72) Inventors: Bhupal Kanaiyalal Dharia, Santa Clara, CA (US); Dibyendu Nandy, San Ramon, CA (US); Marko Bundalo, San Jose, CA (US); Hannan Ma, Rancho Cordova, CA (US)

(73) Assignee: Amazon Technologies, Inc., Seattle, WA (US)

( * ) Notice: Subject to any disclaimer, the term of this patent is extended or adjusted under 35 U.S.C. 154(b) by 12 days.

(21) Appl. No.: 15/692,241

(22) Filed: Aug. 31, 2017

(51) Int. Cl.
  *G06F 15/00* (2006.01)
  *G10L 21/02* (2013.01)
  *G10L 21/0208* (2013.01)
  *G10L 25/78* (2013.01)
  *G10L 25/00* (2013.01)
  *G10L 17/22* (2013.01)

(52) U.S. Cl.
  CPC .......... *G10L 21/02* (2013.01); *G10L 21/0208* (2013.01); *G10L 25/78* (2013.01); *G10L 17/22* (2013.01)

(58) Field of Classification Search
  CPC ..... G10L 21/02; G10L 25/78; G10L 21/0208; G10L 17/22
  USPC ....... 704/200, 202, 207, 208, 231, 246, 251, 704/255
  See application file for complete search history.

(56) References Cited

U.S. PATENT DOCUMENTS

2006/0161430 A1* 7/2006 Schweng ................ G10L 25/78
  704/233

* cited by examiner

*Primary Examiner* — Thierry L Pham
(74) *Attorney, Agent, or Firm* — Lee & Hayes, P.C.

(57) ABSTRACT

This disclosure describes, in part, techniques for performing multi-path calculations for energy levels on an electronic device. For instance, the electronic device may include a first circuit and a second circuit, where the first circuit uses less power than the second circuit. As such, when operating in a standby mode, the electronic device may use the first circuit to calculate energy levels at the electronic device, such as speech-energy values and ambient-energy values. Additionally, while operating in an active mode, the electronic device may active the second circuit and then use the second circuit to calculate the energy levels at the electronic device. The first circuit and the second circuit can send/receive current energy levels between one another so that the electronic device can continually calculate the energy levels even when the electronic device switches between modes of operation.

20 Claims, 15 Drawing Sheets

MULTI-PATH CALCULATIONS FOR DEVICE ENERGY LEVELS

BACKGROUND

As the processing power available to devices and associated support services continues to increase, it has become practical to interact with users in new ways. In particular, it is becoming practical to interact with users through speech. Many devices are now capable of receiving and responding to voice commands, including personal computers, smartphones, tablet devices, media devices, entertainment devices, industrial systems, voice-based assistants, and so forth. In some instances, a user of such devices may include multiple devices in a single environment, where each device can each capture the speech from the user and attempt to interact with the user in response.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
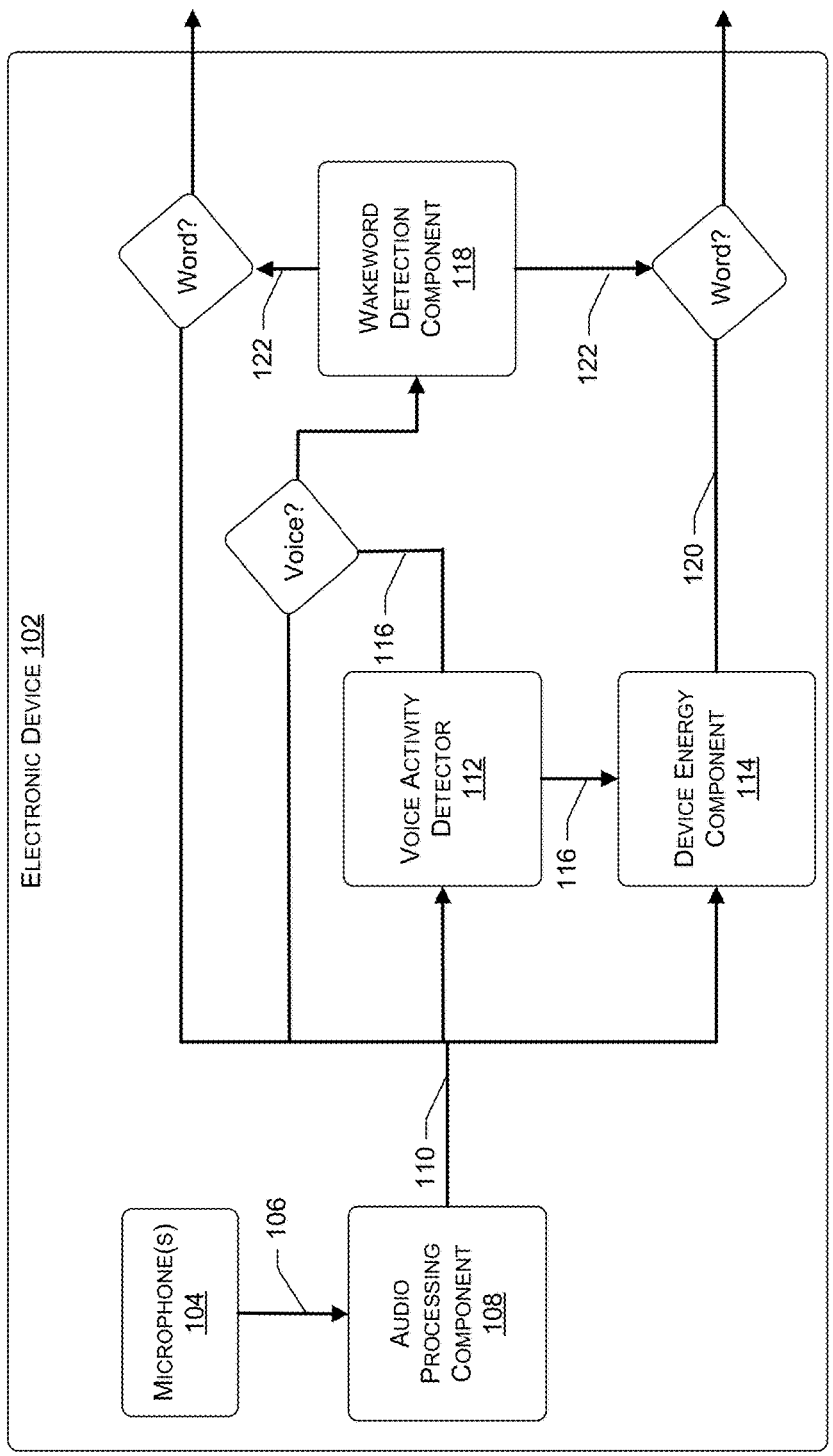
FIG. 1 is a block diagram illustrating an example of an electronic device performing a single-stage calculation for energy levels.

This disclosure describes, in part, techniques for performing multi-path calculations for energy levels on an electronic device. For instance, multiple electronic devices may be located at different locations within an environment, such as a room, house, building, or the like. Each electronic device may include at least one microphone that receives speech from a user within the environment. In response, each electronic device may independently attempt to use a remote system to process and respond to the user speech. For instance, each electronic device may send the remote system an audio signal that represents the user speech. The remote system may provide speech processing and interaction capabilities for each electronic device, including automatic speech recognition (ASR), natural language understanding (NLU), response generation, and text-to-speech (TTS) functionality. Upon determining an intent expressed by the user speech, the remote system sends data back to each electronic device which causes the respective electronic device to perform a function, such as output audio.

In some instances, when receiving audio signals from multiple electronic devices, the remote system performs arbitration to select one of the electronic devices to respond to the user. For instance, the remote system may receive data from each electronic device, such as one or more energy levels determined by the respective electronic device, capabilities of the respective device, a time in which the respective electronic device received the user speech, or the like. In some instances, the energy levels can include speech-energy values and ambient-energy values. The remote system can then analyze the data received from each electronic device and to determine which electronic device to select to respond to the user. For instance, in some examples, the remote system may analyze the data and select the electronic device that is nearest to the user.

An electronic device may utilize multi-path calculations for determining the energy levels on the electronic device. For instance, the electronic device may be configured to operate in both a standby mode and an active mode. Generally, the electronic device operates in the standby mode in order to conserve power. For instance, the standby mode may be characterized as a mode of operation where the electronic device reduces and/or eliminates power to subsystems within the electronic device that are not required by the electronic device when the electronic device is not being used by the user. For instance, the electronic device may shut off the power to the display when the electronic device is not in use. Additionally, or alternatively, the electronic device may reduce a level of activity on one or more on-device processors (such as reducing the clock speed or number of cores that are fully-operational) at times of inactivity to save power.

To perform multi-path calculations, the electronic device may include a first circuit that calculates the energy levels while the electronic device is operating in the standby mode and a second circuit that calculates the energy levels while the electronic device is operating in the active mode. For instance, the first circuit may utilize less power to operate than power utilized by the second circuit. Therefore, in order to conserve power, the electronic device may cause the first circuit to continue operating while the electronic device and the second circuit are operating in the standby mode. While operating in the active mode, the first circuit can continuously calculate the energy levels at the electronic device. Additionally, once the electronic device switches from operating in the standby mode to operating in the active mode, the electronic device may cause the second circuit to activate (e.g., switch from operating in the standby mode to operating in the active mode). While operating in the active mode, the second circuit can then continue to calculate the energy levels at the electronic device.

For instance, during a first path, and when the electronic device is operating in the standby mode, the first circuit may receive at least one audio signal generated by the microphone(s) of the electronic device. The first circuit can then analyze the audio signal to determine the energy levels at the electronic device. For instance, the first circuit may include a first analog-to-digital converter (ADC), a first memory buffer, a first voice activity detector (VAD), a first wakeword detection component, a first frame energy component, a first initial energy component, a calibration component, and a first energy level component. In some instances, the first ADC may receive an analog audio signal from the microphone(s) and convert the analog audio signal to a digital audio signal (also referred to as just an "audio signal"). The first ADC can then output the audio signal to one or more of the first memory buffer, the first VAD, the first frame energy component, and the first wakeword detection component.

The first memory buffer can receive the audio signal from the first ADC and store at least a portion of the audio signal in response. In some instances, since the first circuit can include a low-power circuit, the first buffer memory may only be capable of storing a small portion (e.g., a few second) of the audio signal. The first VAD can analyze the audio signal to determine whether the audio signal represents user speech (e.g., a human voice). In some instances, the first VAD analyzes audio frames of the audio signal. For instance, in some examples, the first VAD can analyze 5 millisecond to 20 millisecond portions of the audio signal. In some instances, the first VAD can further utilize previous audio frames to determine if a current audio frame represents user speech. For instance, the first VAD can keep an internal history indicating whether previous audio frames represented user speech and use the internal history to determine if a current audio frame represents user speech. Based on determining that an audio frame represents user speech, the first VAD may output a first value indicating that the audio frame represents user speech. Additionally, based on determining that an audio frame does not represent user speech, the first VAD may output a second value indicating that the audio frame does not represent user speech (e.g., the audio frame represents ambient noise).

The first frame energy component can analyze the audio signal (e.g., the frames of the audio signal) to determine frame energies for the audio signal (also referred to as "energy value"). The frame energy value of an audio frame can represent an amount of energy of the audio frame. The first frame energy component can then output the respective frame energy value of each of the audio frames. The calibration component can receive both the output values from the first VAD, which indicate whether audio frames represents user speech, as well as the frame energy values from the first frame energy component, which indicate the frame energy of the audio frames, and perform calibration on the outputs. The calibration component can then output the calibrated values from the first VAD and the calibrated frame energy values from the first frame energy component.

The first energy level component can calculate both the speech-energy value and the ambient-energy value at the electronic device using the received signals. The ambient-energy value can represent the background energy level at a location of the electronic device. In some instances, an ambient-energy value is a positive 32-bit single-precision floating point number. In some instances, the ambient-energy value can include a number between 0 and 1. In other instances, the ambient-energy value can include a number that falls between a different range (e.g., 0-100). The speech-energy value can represent the amount of user speech that is detected at the location of the electronic device. In some instances, the speech-energy value is a 32-bit single-precision floating point number. In some instances, the speech-energy value can also include a number between 0 and 1. In other instances, the speech-energy value can include a number that falls between a different range (e.g., 0-100).

In some instances, the first energy level component requires a threshold amount of time of the audio signal to calculate an initial speech-energy value and an initial ambient-energy value. For instance, the first energy level component may require five seconds, eight seconds, ten seconds, or the like of the audio signal to calculate the initial speech-energy value and the initial ambient-energy value. The first energy level component can then continue to calculate the speech-energy values and the ambient-energy values on a frame-by-frame basis. For instance, the first energy level component can update the speech-energy value and the ambient-energy value based on whether each frame represents user speech and the frame energy value for the respective frame.

For instance, the first energy level component may calculate a first speech-energy value (e.g., initial speech-energy value) and a first ambient-energy value (e.g., initial ambient-energy value) using a threshold amount of time of the audio signal. The first energy level component can then update the first speech-energy value and/or the first ambient-energy value using a next frame of the audio signal. In some instances, the first energy level component mainly updates the first speech-energy value based on the output from the first VAD indicating that the audio frame represents user speech. For instance, the first energy level component can calculate a second speech-energy value by updating the first speech-energy value based on the output from the first VAD indicating that the audio frame represents user speech and the frame energy value for the audio frame (e.g., increase the first speech-energy value).

Alternatively, in some instances, the first energy level component updates the first speech-energy value and the first ambient-energy value based on the output from the first VAD indicating that the audio frame does not represent user speech. For instance, the first energy level component can calculate a second speech-energy value and a second ambient-energy value by respectively updating the first speech-energy value and the first ambient-energy value based on the output from the first VAD indicating that the audio frame does not represent user speech and the frame energy value for the audio frame. In some instances, when the audio frame does not represent user speech, the first energy level component may calculate the second speech-energy value by decreasing the first speech-energy value and calculate the second ambient-energy value by increasing the first ambient-energy value.

The first energy level component can continue to perform the above calculations using frames of the audio signal being received by the microphone(s) until the electronic device and/or the second circuit switches from operating in the standby mode to operating in the active mode. For instance, the first wakeword detection component of the first circuit may analyze the audio signal to determine that the audio signal represents a wakeword. In some instances, to determine that the audio signal represents a wakeword, the first wakeword detection component analyzes the audio signal to determine a likelihood that the audio signal represents the wakeword. If the likelihood exceeds a predetermined threshold, the first wakeword detection component can determine that the audio signal represents the wakeword and, in response, output a signal to activate the second circuit (e.g., a switch signal). The second circuit can include an activation circuit that activates the second circuit when receiving the signal from the first circuit. Once activated, the second circuit can start calculating the energy levels at the electronic device.

For instance, the second circuit may include a second ADC, a second memory buffer, a second VAD, a second wakeword detection component, a second frame energy component, a second initial energy level component, and a second energy level calculation component. Based on the second circuit activating, the second initial energy level component can receive the current speech-energy value and the current ambient-energy value from the first circuit. Additionally, the second circuit can receive at least a portion of the audio signal from the first buffer memory of the first circuit, where the portion of the audio signal represents at least the wakeword. The second circuit can then analyze the portion of the audio signal using the second wakeword detection component to determine if the portion of the audio signal represents the wakeword (e.g., by using a similar process as above for the first wakeword detection component). Based on determining that the portion of the audio signal represents the wakeword, the second wakeword detection component may output an additional switch signal that causes the electronic device to be fully active. For instance, the electronic device may connect to the remote system based on receiving the additional switch signal. The electronic device may then send at least a portion of the audio signal to the remote system for processing.

In some instances, the second circuit may further cause the electronic device to send, to the remote system, data indicating the current energy levels received from the first circuit. The second circuit can then use the current speech-energy value and the current ambient-energy value to continue calculating the speech-energy values and the ambient-energy values at the electronic device. In some instances, since the second circuit receives and uses the current energy levels from the first circuit, the second circuit is not required to calculate initial energy levels using the threshold amount of time of the audio signal.

In some instances, the second circuit can further receive an indication of the last audio frame that the first circuit analyzed to determine the current energy levels. In some instances, the indication can include a marker that indicates the end of the wakeword as represented by the audio signal. The second circuit can then use the marker to determine which audio frame to analyze to continue the calculations of the energy levels. For instance, the second circuit can analyze an audio frame that follows the last audio frame that the first circuit analyzed to determine the current energy levels. Additionally, after analyzing the audio signal received from the first circuit, the second circuit can then receive the audio signal (also referred to as a "second audio signal" or "second portion of the audio signal") from the microphone(s) and use the received audio signal to continue calculating the energy levels.

For instance, the second ADC may receive an analog audio signal from the microphone(s) and convert the analog audio signal to a digital audio signal (also referred to as just an "audio signal"). The second ADC can then output the audio signal to one or more of the second memory buffer, the second VAD, the second frame energy component, and the second wakeword detection component. The second memory buffer can receive the audio signal from the second ADC and store at least a portion of the audio signal in response.

The second VAD can analyze the audio signal to determine whether the audio signal represents user speech (e.g., a human voice). In some instances, similar to the first VAD, the second VAD analyzes audio frames of the audio signal. Additionally, in some instances, similar to the first VAD, the second VAD can utilize previous audio frames to determine if a current audio frame represents user speech. For instance, the first VAD can keep an internal history indicating whether previous audio frames represented user speech and use the internal history to determine if a current audio frame represents user speech. Based on determining that an audio frame represents user speech, the second VAD outputs a first value indicating that the audio frame represents user speech. Additionally, based on determining that an audio frame does not represent user speech, the second VAD outputs a second value indicating that the audio frame does not represent user speech (e.g., the audio frame represents ambient noise).

The second frame energy component can analyze the audio signal (e.g., the frames of the audio signal) to determine frame energy values for the audio signal. The second frame energy component can then output the frame energy values. The second energy level component can continue to calculate both the speech-energy values and the ambient-energy values at the electronic device using the output values from the second VAD and the frame energy values from the second frame energy component, using a similar process as described above with regard to the first energy level component (which may not be calibrated). Additionally, the second circuit may cause the electronic device to send data representing the speech-energy values and data representing the ambient-energy values to the remote system. In some instances, the electronic device sends the data each time the second circuit detects the wakeword, each time the electronic device receives user speech from the user, and/or the like.

The second circuit can continue to calculate the energy levels at the electronic device until the electronic device switches from operating in the active mode to operating in the standby mode. Based on the electronic device switching modes, the second circuit can send current energy levels back to the first circuit. For instance, the second circuit can send the current speech-energy value and the current ambient-energy value to the first circuit. Additionally, the second circuit can then switch from operating in the active mode to operating in the standby mode. The first initial energy level component of the first circuit can receive the current energy levels from the second circuit. The first energy level component can then use the current speech-energy value and the current ambient-energy value received from the second circuit to continue to calculating the speech-energy values and the ambient-energy values at the electronic device using the processes described above.

As used herein, a "switch signal" can be as simple as applying a signal to close a switch or a current to the base or gate of a transistor that is acting as a switch. A switch signal may also be an interrupt signal that more complex circuitry would receive and act accordingly.

As used herein, the term "wakeword" may correspond to a "keyword" or "key phrase," an "activation word" or "activation words," or a "trigger," "trigger word," or "trigger expression." One exemplary wakeword may be a name, such as the name, "Alexa," however any word (e.g., "Amazon"), or series of words (e.g., "Wake Up" or "Hello, Alexa") may alternatively be used as the wakeword. Furthermore, the wakeword may be set or programmed by an individual operating a voice activated electronic device, and in some instances more than one wakeword (e.g., two or more different wakewords) may be available to activate a voice activated electronic device. In yet another instance, the trigger that is used to activate a voice activated device may be any series of temporally related sounds.

As used herein, the term "utterance" may correspond to a spoken word, statement, or sound. In some instances, an utterance may include the wakeword followed by an invocation, such as a request, question, or command. In these particular instances, the utterance may begin with the wakeword being spoken, and may end when a last word, phoneme, or sound is spoken. For example, an utterance may correspond to the question, "Alexa—What will the weather be today?" As another example, an utterance may be, "Alexa—Play my favorite song." Further still, an utterance, which need not include the wakeword, may be, "Turn up the volume" or "Call mom."

As used herein, the term "frame" or "audio frame" can represent a portion of an audio signal. For instance, in some examples, an audio frame can represent a 5 millisecond to 20 millisecond portion of an audio signal. However, in other examples, an audio frame can represent a different portion of the audio signal, such as 1 millisecond, thirty milliseconds, 1 second, or the like portion of an audio signal. Additionally, as used herein, a signal can include data indicating a given energy value. Additionally, an indication can include data indicating a given energy value.

In some instances, the electronic device may additionally, or alternatively, correspond to a manually activated electronic device. A manually activated electronic device, as described herein, may correspond to an electronic device that is capable of being activated in response to a manual input from an individual (e.g., pressing a button, touching a portion of a touch screen, performing an action on the electronic device). For example, a tap-to-talk electronic device is one type of manually activated device. Such tap-to-talk electronic devices, for instance, are capable of obtaining and outputting audio data in response to a button being pressed by an individual. In some instances, a sound controlled electronic device (e.g., a voice activated electronic device and/or a sound activated electronic device) may include manual activated functionality such that an individual may interact with the electronic device using voice (e.g., speech prefaced by a wakeword), sound (e.g., a particular trigger sound), and/or a manual input (e.g., a button press, a touch of a screen, etc.).

In some instances, when an electronic device is manually activated, the electronic device may perform a similar process as described. For instance, the first circuit may cause the second circuit to activate and then send the second circuit the current energy levels in response to the second circuit activating. However, in some instances, the first circuit may not send the second circuit the audio signal as stored in the buffer memory. Additionally, the second circuit may not cause the electronic device to send the data indicating the current energy levels to the remote system. Rather, the second circuit may just use the current energy levels received from the first circuit to continually update the energy levels using the processes described above.

FIG. 1 is a block diagram illustrating an example of an electronic device 102 performing a single stage calculation for energy levels. In some instances, the electronic device 102 performs the single stage energy level calculation when the electronic device 102 does not operate in a standby mode (e.g., the electronic device 102 only operates in the active mode). In some instances, the electronic device 102 may perform the single state calculation using a circuit, such as a System on Chip (SoC), a digital signal processor (DSP), or any other type of microcontroller or microprocessor.

As shown, the electronic device 102 may include one or more microphone(s) 104 that capture sound within an environment of the electronic device 102. The sound can include user speech, ambient noise (e.g., background noise), or the like. The microphone(s) 104 can then generate at least one audio signal 106 that represents the sound, where the audio signal 106 may include an analog audio signal. The microphone(s) 104 can then output the audio signal 106 to an audio processing component 108 for processing of the audio signal 106. For instance, the audio processing component 108 may process the audio signal 106 using one or more of echo cancellation, beamforming, gain control, beam selection, or the like. Additionally, the audio processing component 108 may process the audio signal 106 by converting the audio signal 106 from an analog audio signal to a digital audio signal. However, in some instances, the electronic device 102 may not include the audio processing component 108 to process the audio signal 106 from the microphone(s) 104.

The audio processing component 108 can then output the processed audio signal 110 to each of a VAD 112 and a device energy component 114. The VAD 112 can analyze the audio signal 110 to determine whether the audio signal 110 represents user speech (e.g., a human voice). In some instances, the VAD 112 analyzes audio frames of the audio signal 110. For instance, in some examples, the VAD 112 can analyze 5 millisecond to 20 millisecond portions of the audio signal 110, which may each represents an audio frame. Based on determining that an audio frame represents user speech, the VAD 112 outputs at least one value 116 indicating that the audio frame represents user speech. In some instances, the value 116 can indicate the status of the VAD, where the status includes 1 indicating that the audio frame is a speech frame. Additionally, based on determining that the audio frame does not represent user speech, the VAD 112 outputs a value (which may also be represented by 116) indicating that the audio frame does not represent user speech (e.g., the audio frame represents ambient noise). In some instances, the value can indicate a status of 0, which indicates that the audio frame is an ambient noise frame.

The device energy component 114 calculates one or more energy levels associated with the audio signal 110. For instance, the device energy component 114 can calculate the speech-energy value and the ambient-energy value of the audio signal 110, which is described in detail with regard to FIG. 2. As discussed above, the ambient-energy value can represent the background energy level at a location of the electronic device 102. In some instances, the ambient-energy value can include a value between 0 and 1. Additionally, the speech-energy value can represent the amount of user speech that is detected at the location of the electronic device 102. In some instances, the speech-energy value can include a value between 0 and 1. The device energy component 114 can then output data 120 that represents the voice energy level and the ambient-energy value. In some instances, the device energy component 114 outputs separate data 120 respectively representing the speech-energy value and the ambient-energy value.

In some instances, based on the VAD 112 outputting a value 116 that indicates that the audio frame represents user speech, the wakeword detection component 118 analyzes the audio signal 110 to determine whether the user speech represented by the audio signal 110 includes a wakeword. For instance, the wakeword detection component 118 may analyzes the audio signal 110 to determine a likelihood that the audio signal 110 represents the wakeword. If the likelihood exceeds a predetermined threshold, the wakeword detection component 118 can output a value 122 (which may be a signal) that indicates that the audio signal 110 represents a wakeword.

Figure 4:
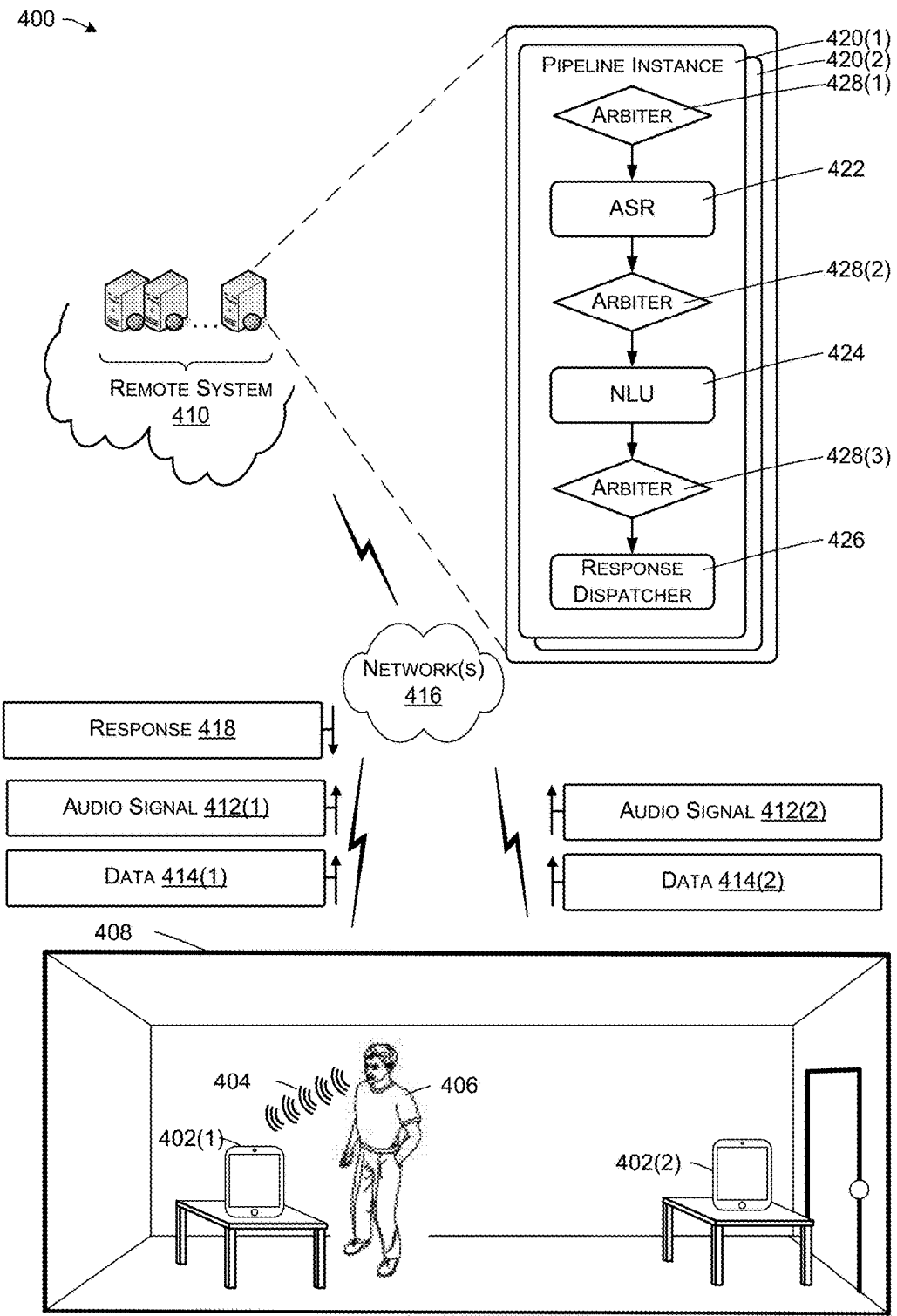
FIG. 4 is a block diagram illustrating an example speech-based system that receives user utterances from multiple speech interface devices and performs an arbitration process in response.

Based on the value 122 output by the wakeword detection component 118, the electronic device 102 may send at least a portion of the audio signal 110 and the data 120 that represents the voice energy level and the ambient-energy value to one or more remote computing devices. For instance, and as shown in the example of FIG. 4, the electronic device 102 can output the audio signal 110 and the data 120 to a remote system that analyze the audio signal 110 and/or the data 120 when performing arbitration to select an electronic device to respond to a user. In some instances, the electronic device 102 may further send the one or more remote computing devices data indicating one or more capabilities of the electronic device 102, a current state of the electronic device, a microphone layout of the electronic device 102, and/or the like. In such instances, the one or more remote computing devices can further use the additional data when performing arbitration to select an electronic device to respond to a user.

Figure 2:
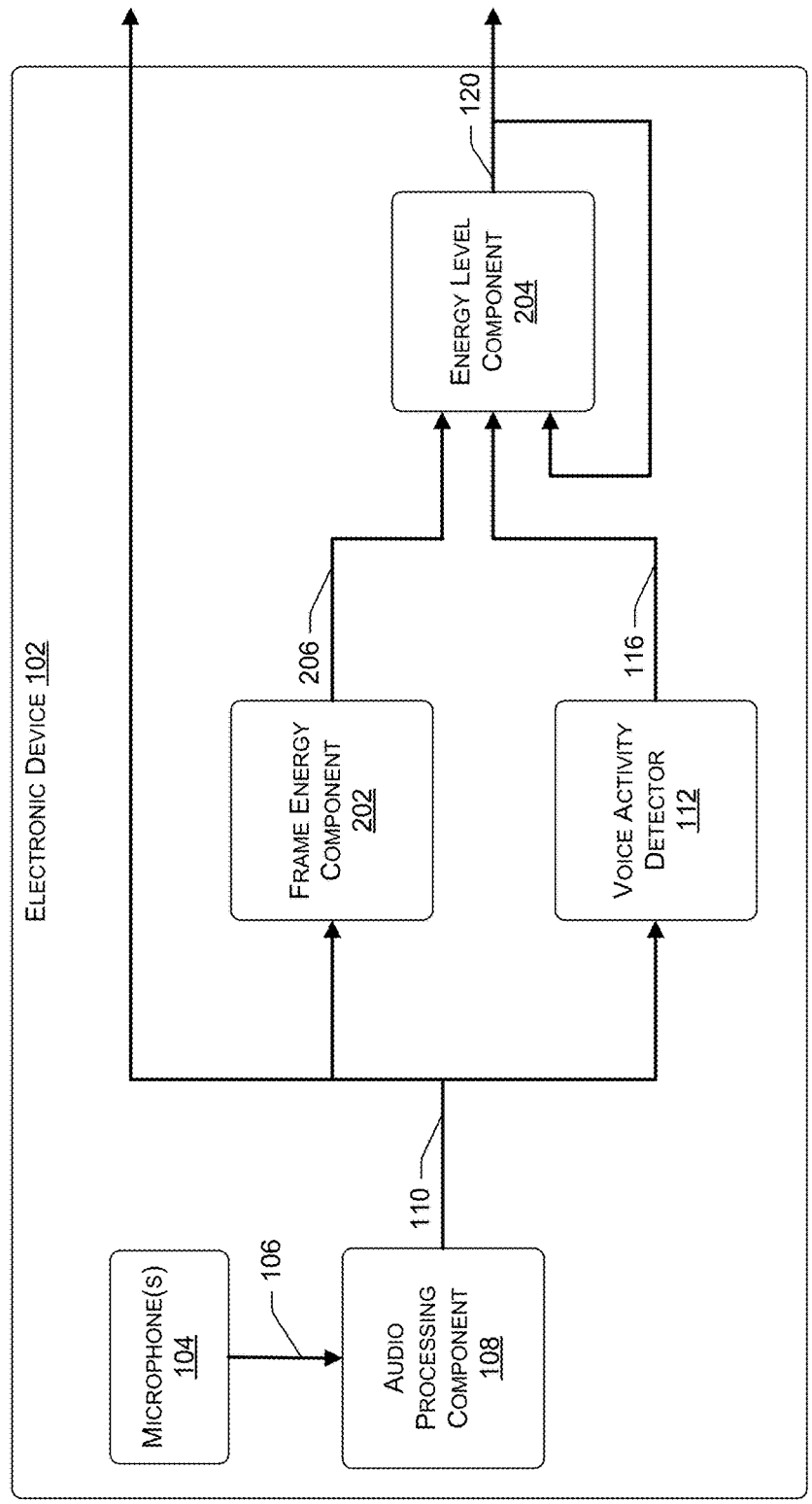
FIG. 2 is a block diagram illustrating an example of calculating energy levels during the single-stage calculation.

FIG. 2 is a block diagram illustrating an example of calculating energy levels during the single stage calculation. As shown, the electronic device 102 includes a frame energy component 202 that analyzes the audio signal 110 to determine frame energy values of the audio signal 110. In some instances, the frame energy component 202 performs the analysis on each frame of the audio signal 110 which, as described above, can include 5 millisecond to 20 millisecond portions of the audio signal 110, to determine the frame energy value of each audio frame. In some instances, the frame energy component 202 can use one or more algorithms to calculate the frame energy value of each frame of the audio signal 110. For example, the frame energy component 202 can take an average of absolute values of audio samples to determine the frame energy value. For another example, the frame energy component 202 can sum up the square of each of each audio sample and take its average. In some instances, the frame energy component 202 may first filter the audio signal 110 (e.g., high pass, low pass, band pass, etc.) before calculating the frame energy values.

An energy level component 204 can receive both the output values 116 from the VAD 112, which indicates whether the audio frame represents user speech, and the frame energy values 206 from the frame energy component 202 to calculate one or more energy levels on the electronic device 102. For instance, the energy level component 204 can utilize the output values 116 and the frame energy values 206 to calculate both the speech-energy value and the ambient-energy value at the electronic device 102. In some instances, the energy level component 204 requires a threshold amount of time of the audio signal 110 to calculate an initial speech-energy value and an initial ambient-energy value at the electronic device 102. For instance, the energy level component 204 may require five seconds, eight seconds, ten seconds, or the like of the audio signal 110 to calculate the initial speech-energy value and the initial ambient-energy value. The energy level component 204 can then continue to calculate the speech-energy value and the ambient-energy value on a frame-by-frame basis. For instance, the energy level component 204 can update the speech-energy value and the ambient-energy value based on whether each frame represents user speech and the frame energy value for the respective frame.

For instance, energy level component 204 may calculate a first speech-energy value (e.g., initial speech-energy value) and a first ambient-energy value (e.g., initial ambient-energy value) using a threshold amount of time of the audio signal 110. The energy level component 204 can then update the first speech-energy value and/or the first ambient-energy value using a next frame of the audio signal 110. In some instances, the energy level component 204 mainly updates the first speech-energy value based on the output value 116 from the VAD 112 indicating that the audio frame represents user speech. For instance, the energy level component 204 can calculate a second speech-energy value by updating the first speech-energy value based on the output value 116 from the VAD 112 indicating that the audio frame represents user speech and the frame energy value 206 from the frame energy component 202 (e.g., increase the first speech-energy value and/or decrease the first speech-energy level).

Alternatively, in some instances, the energy level component 204 updates the first speech-energy value and the first ambient-energy value based on the output value 116 from the VAD 112 indicating that the audio frame does not represent user speech. For instance, the energy level component 204 can calculate a second speech-energy value and a second ambient-energy value by respectively updating the first speech-energy value and the first ambient-energy value based on the output value 116 from the VAD 112 indicating that the audio frame does not represent user speech and the frame energy value 206 from the frame energy component 202. In some instances, when the audio frame does not represent user speech, the energy level component 204 may calculate the second speech-energy value by decreasing the first speech-energy value and calculate the second ambient-energy value by increasing the first ambient-energy value.

The energy level component 204 can continue to perform the above calculations using frames of the audio signal 110 being received by the microphone(s) 104. For instance, the energy level component 204 may continuously perform the above calculations so that the energy level component 204 does not require the threshold amount of time of audio signal 110 to once again calculate an initial speech-energy value and an initial ambient-energy value. Additionally, the electronic device 102 can send at least a portion of the audio signal 110 and the data 120 representing each calculated energy level (e.g., speech-energy value and ambient-energy value). In some instances, the energy level component 204 sends the at least the portion of the audio signal 110 and/or the data 120 based on detecting a wakeword, detecting user speech from a user, at given time intervals, continuously, and/or the like.

FIGS. 3A-3D are block diagrams illustrating an example of an electronic device 302 performing a multi-stage calculation for energy levels. For instance, the electronic device 302 may be configured to operate in both a standby mode and an active mode. Generally, the electronic device 302 operates in the standby mode in order to conserve power. For instance, the standby mode may be characterized as a mode of operation where the electronic device 302 reduces and/or eliminates power to subsystems within the electronic device 302 that are not required by the electronic device 302 when the electronic device 302 is not being utilized by a user. For instance, the electronic device 302 may shut off the power to the display when the electronic device 302 is operating in the standby mode. Additionally, or alternatively, the electronic device 302 may reduce a level of activity on one or more on-device processors (such as reducing the clock speech or number of cores that are fully-operational) at times in which the electronic device 302 is operating in the standby mode.

For instance, in some examples, the standby mode may refer to a state of the electronic device 102 where power is cut from unneeded subsystems and the electronic device's 102 random access memory ("RAM") is put in a minimum power state. In some instances, this minimum power state may be a power state sufficient to retain the data of portable the electronic device 102. The standby mode may include low power sleep state, sleep mode, suspend mode, suspend to ram mode, hybrid sleep mode, and hibernation mode. This list is merely exemplary and any low power mode for electronic devices may be included in standby mode.

To perform multi-path calculations, the electronic device 302 may include a first circuit 304 that calculates the energy levels while the electronic device 302 is operating in the standby mode and a second circuit 306 that calculates the energy levels while the electronic device 302 is operating in the active mode. For instance, the first circuit 304 may be characterized as a low-power circuit that utilizes less power than the second circuit 306. In some instances, the first circuit 304 can include a DSP and the second circuit 306 can include a SoC. However, in other instances, each of the first circuit 304 and the second 306 can include any type of microcontroller or microprocessor.

In order to conserve power, the electronic device 302 may cause the first circuit 304 to stay active while the electronic device 302 is operating in the standby mode. In some instances, active may refer to a mode where the electronics on a circuit are operating at a power state that is above standby mode. As such, since the first circuit 304 may include a low-power circuit that utilizes a minimal amount of power from the electronic device 302, the first circuit 304 can continue to calculate the energy levels on the electronic device 302 while the electronic device operates in the standby mode. Additionally, while the electronic device 302 operates in the standby mode, the second circuit 306 may also be operating in a standby mode. For instance, the second circuit 306 may not be receiving power and/or may be receiving a minimal amount of power from the electronic device 302.

During a first path, when the electronic device 302 is operating in the standby mode, the microphone(s) 308 of the electronic device 302 may continue to receive sound from an environment in which the electronic device 302 is located. The microphone(s) 308 may then generate at least one audio signal 310 that represents the sound and output the audio signal 310 to a first audio processing component 312. The first audio processing component 312 can process the audio signal 310 using similar techniques as the audio processing component 108 described above. For instance, the first audio processing component 312 may convert analog audio signals to digital audio signals. Additionally, or alternatively, the first audio processing component 312 may process the audio signal 310 using one or more of echo cancellation, beamforming, gain control, beam selection, or the like. The first audio processing component 312 then sends the processed audio signal 314 to one or more of a buffer memory 316, a wakeword detection component 318, a first frame energy component 320, and a first VAD 322 on the first circuit 304.

The buffer memory can store at least a portion of the audio signal 314. Additionally, the first VAD 322 can analyze the audio signal 314 to determine whether the audio signal 314 represents user speech (e.g., a human voice). In some instances, the first VAD 322 analyzes audio frames of the audio signal 314. For instance, in some examples, the first VAD 322 can analyze 5 millisecond to 20 millisecond portions of the audio signal 314. Based on determining that an audio frame represents user speech, the first VAD 322 outputs a value 324 indicating that the audio frame represents user speech. In some instances, the value 324 can indicate a status, where the status includes 1 indicating that the audio frame is a speech frame. Additionally, based on determining that an audio frame does not represent user speech, the first VAD 322 outputs a value (which may also be represented by 324) indicating that the audio frame does not represent user speech (e.g., the audio frame represents ambient noise). In some instances, the value can indicate a status of 0, which indicates that the audio frame is an ambient noise frame.

The first frame energy component 320 can analyze audio signal 314 to determine energies of the audio signal 314. In some instances, the first frame energy component 320 performs the analysis on each frame of the audio signal 314 to determine the frame energy value of the respective frame. In some instances, the first frame energy component 320 can use one or more algorithms to calculate the frame energy value of each frame of the audio signal 314. For example, the first frame energy component 320 can take an average of absolute values of audio samples to determine the frame energy value. For another example, the first frame energy component 320 can sum up the square of each audio sample and take its average. In some instances, the first frame energy component 320 may first filter the audio signal 314 (e.g., high pass, low pass, band pass, etc.) before calculating the frame energy values. The first frame energy component 320 can output the frame energy values 326 for the audio signal 314.

The calibration component 328 can receive both the output values 324 from the first VAD 322, which indicate whether audio frames represents user speech, as well as the frame energy values 326 from the first frame energy component 320 and perform calibration on the values. For instance, in some examples, for the energies levels to be calculated correctly using the multi-path calculation, each of the first energy level component 330 and the second energy level component 332 are required to calculate similar energy levels when analyzing a similar audio signal. Therefore, in some instances, the calibration component 328 can calibrate the values from the first frame energy component 320 and the first VAD 322 so that the energy levels calculated by each of the first energy level component 330 and the second energy level component 332 are similar to one another (which is described in detail below). However, in other instances, the first circuit 304 may not include the calibration component 328, and the output values from the first frame energy component 320 and the first VAD 322 may be sent directly to the first energy level component 330.

The first energy level component 330 can receive output values 334 from the calibration component 328, which can represent the calibrate values 324 and the calibrated frame energy values 326 (although, in some instances, they may not be calibrated). The first energy level component 330 can then utilize the outputs, along with one or more algorithms, to calculate energy levels at the electronic device 302. In some instances, the energy levels include the speech-energy value and the ambient-energy value at the electronic device 302. In some instances, the first energy level component 330 requires a threshold amount of time of the audio signal 314 to calculate an initial speech-energy value and an initial ambient-energy value. For instance, the first energy level component 330 may require five second, eight second, ten second, or the like of the audio signal 314 to calculate the initial speech-energy value and the initial ambient-energy value. The first energy level component 330 can then continue to calculate the speech-energy value and the ambient-energy value on a frame-by-frame basis. For instance, the first energy level component 330 can update the speech-energy value and the ambient-energy value based on whether each frame represents user speech and the frame energy value for the respective frame.

For instance, first energy level component 330 may calculate a first speech-energy value (e.g., initial speech-energy value) and a first ambient-energy value (e.g., initial ambient-energy value) using a threshold amount of time of the audio signal 314. The first energy level component 330 can then update the first speech-energy value and/or the first ambient-energy value using a next frame of the audio signal 314. In some instances, the first energy level component 330 mainly updates the first speech-energy value based on the output value 324 from the first VAD 322 (which may be calibrated) indicating that the audio frame represents user speech. For instance, the first energy level component 330 can calculate a second speech-energy value by updating the first speech-energy value based on the output value 324 from the first VAD 322 indicating that the audio frame represents user speech and the frame energy value from the first frame energy component 320 (e.g., increase the first speech-energy value).

Alternatively, in some instances, the first energy level component 330 can update the first speech-energy value and the first ambient-energy value based on the output value 324 from the first VAD 322 indicating that the audio frame does not represent user speech. For instance, the first energy level component 330 can calculate a second speech-energy value and a second ambient-energy value by respectively updating the first speech-energy value and the first ambient-energy value based on the output value 324 from the first VAD 322 indicating that the audio frame does not represent user speech and the frame energy value from the first frame energy component 330. In some instances, when the audio frame does not represent user speech, the first energy level component 330 may calculate the second speech-energy value by decreasing the first speech-energy value and calculate the second ambient-energy value by increasing the first ambient-energy value.

The first energy level component 330 can continue to perform the above calculations using frames of the audio signal 314 until the second circuit 306 is activated and/or the electronic device 302 switches from operating in the standby mode to operating in the active mode. For instance, the first wakeword detection component 318 of the first circuit 304 may analyze the audio signal 314 to determine that the audio signal represents a wakeword. In some instances, to determine that the audio signal 314 represents the wakeword, the first wakeword detection component 318 analyzes the audio signal 314 to determine a likelihood that the audio signal 314 represents the wakeword. If the likelihood exceeds a predetermined threshold, the first wakeword detection component 318 can output a switch signal to activate the second circuit 306. The second circuit 306 can include an activation circuit that activates the second circuit 306 when receiving the switch signal from the first circuit 304. Once activated, the second circuit 306 can start calculated the energy levels at the electronic device 302.

As shown, the first circuit 304 further includes a first initial energy component 336. Additionally, the second circuit 306 includes a second wakeword detection component 338, a buffer memory 340, a second frame energy component 342, a second VAD 344, the second energy level component 332, a second initial energy component 346, and a second audio processing component 348. To start calculating the energy levels on the second circuit 306, and as illustrated in FIG. 3B, the first circuit 304 can initially send the current energy levels (e.g., the current voice energy level and the current ambient-energy value) as calculated by the first energy level component 330, which is represented by 350. In some instance, the first circuit 304 sends the second circuit one or more signals that represent the current energy level values. The second initial energy component 346 can receive the current energy levels from the first circuit 304 and output the current energy levels to the second energy level component 332, which is represented by 352.

In some instances, if the second circuit 306 was activated based on the first circuit 304 detecting a wakeword, the second circuit 306 can receive at least a portion of the audio signal 314 that is stored in the buffer memory 316, where the at least the portion represents at least the wakeword. The second circuit 306 can then use the second wakeword detection component 338 to analyze the at least the portion of the audio signal 314 to determine that the at least the portion of the audio signal 314 represents the wakeword (using a similar process as the first wakeword detection component 318 above). In some instances, based on detecting the wakeword, the second wakeword detection component 318 can output a switch signal that causes the electronic device 302 to be fully active. For instance, the electronic device 302 may connect to the remote system based on receiving the switch signal. The electronic device 302 the second energy level component 332 can cause the electronic device 302 to send both data 354 that indicates the current energy levels (e.g., the current voice energy level and the current ambient-energy value), as well as the portion of the audio signal 314 received from the first circuit 304, to the remote system.

However, in other instances, if the second circuit 306 is activated based on the electronic device 302 receiving manual input, then the first circuit 304 may refrain from sending the at least the portion of the stored audio signal 314 from the first memory buffer 316 to the second circuit 306. Additionally, the second energy level component 332 may refrain from causing the electronic device 302 to the data 354 to the remote system.

The second energy level component 332 can further use the current energy levels received from the first circuit 304 as initial energy levels to start calculating the energy levels at the electronic device 302. In some instances, since the second circuit 306 receives and uses the current energy levels from the first circuit 304, the second circuit 306 is not required to calculate initial energy levels using a threshold amount of time of the audio signal 310. For instance, the second energy level component 332 is not required to analyze the threshold amount of time of the audio signal 310 to calculate an initial speech-energy value and an initial ambient-energy value.

In some instances, the second circuit 306 can further receive data indicating the last audio frame that the first circuit 304 analyzed to determine the current energy levels. In some instances, the indication can include a marker that indicates the end of the wakeword as represented by the audio signal 314. The second circuit 306 can then use the marker to determine which audio frame to analyze to continue the calculations of the energy levels. For instance, the second circuit 306 can analyze an audio frame that follows the last audio frame that the first circuit 304 analyzed to calculate the energy levels. Additionally, after analyzing the audio signal received from the first circuit 304, the second circuit 306 can continue receiving the audio signal 310 (which may be referred to as a "second audio signal" or a "second portion of the audio signal") generated by the microphone(s) 308 and use that audio signal 310 to continue calculating the energy levels.

For instance, the second audio processing component 348 can receive the audio signal 310 from the microphone(s) 308 can begin processing the audio signal 310 using similar techniques as the first audio processing component 312 described above. For instance, the second audio processing component 348 can process the audio signal 310 using one or more of echo cancellation, beamforming, gain control, beam selection, or the like. Additionally, the second audio processing component 348 may convert analog audio signals to digital audio signals. The second audio processing component 348 then sends the processed audio signal 356 to one or more the second wakeword detection component 338, the second buffer memory 340, the second frame energy component 342, and the second VAD 344.

In some instances, the second VAD 344 can perform similar processing as the VAD 112. For instance, the second VAD 344 can analyze the audio signal 356 to determine whether the audio signal 356 represents user speech (e.g., a human voice). In some instances, the second VAD 344 analyzes audio frames of the audio signal 356. For instance, in some examples, the second VAD 344 can analyze 5 millisecond to 20 millisecond portions of the audio signal 356. Based on determining that an audio frame represents user speech, the second VAD 344 outputs a value 358 indicating that the audio frame represents user speech. In some instances, the value 356 can indicate the status, where the status includes 1 indicating that the audio frame is a speech frame. Additionally, based on determining that an audio frame does not represent user speech, the second VAD 344 outputs a value 358 indicating that the audio frame does not represent user speech (e.g., the audio frame represents ambient noise). In some instances, the value can indicate a status of 0, which indicates that the audio frame is an ambient noise frame.

In some instances, the second frame energy component 342 can perform similar processing as the frame energy component 202. For instance, the second frame energy component 342 can analyze the audio signal 356 to determine energies of the audio signal 356. In some instances, the second frame energy component 342 performs the analysis on each frame of the audio signal 356 to determine the frame energy value of each frame. In some instances, the second frame energy component 342 can use one or more algorithms to calculate the frame energy value of each frame of the audio signal 356. For example, the second frame energy component 342 can take an average of absolute values of audio samples to determine the frame energy value. For another example, the second frame energy component 342 can sum up the square of each of each audio sample and take its average. In some instances, the second frame energy component 342 may first filter the audio signal 356 (e.g., high pass, low pass, band pass, etc.) before calculating the frame energy values. The second frame energy component 342 can output frame energy values 360 for the audio signal 356.

The second energy level component 332 can receive the output values 358 from the second VAD 344 and the frame energy values 360 from the second frame energy component 342. The second energy level component 332 can then utilize each of the values to calculate both the speech-energy values and the ambient-energy values at the electronic device 302. As discussed above, in some instances, since the second circuit 306 receives the current speech-energy value and the current ambient-energy value from the first circuit 304, the second energy level component 332 does not require a threshold time of the audio signal 356 to calculate an initial speech-energy value and an initial ambient-energy value. Rather, the second energy level component 332 can update the current speech-energy value and the current ambient-energy value received from the first circuit 304. Additionally, the second energy level component 332 can continue to update the speech-energy value and the ambient-energy value using the output values 358 from the second VAD 344 and the frame energy values 360 from the second frame energy component 342.

For instance, second energy level component 332 may update the current speech-energy value and/or the current ambient-energy value received from the first circuit 304 using a next frame of the portion of the audio signal that the second circuit 306 received from the first circuit and/or a frame of the audio signal 356. In some instances, the second energy level component 332 mainly updates the current speech-energy value based on the output value 360 from the second VAD 344 indicating that the audio frame represents user speech. For instance, the second energy level component 332 can calculate a second speech-energy value by updating the current speech-energy value based on the output value 360 from the second VAD 344 indicating that the audio frame represents user speech and the frame energy value 360 for the audio frame (e.g., increase the current speech-energy value).

Alternatively, in some instances, the second energy level component 332 can update the current speech-energy value and the current ambient-energy value based on the output value 360 from the second VAD 344 indicating that the audio frame does not represent user speech. For instance, the second energy level component 332 can calculate a second speech-energy value and a second ambient-energy value by respectively updating the current speech-energy value and the current ambient-energy value based on the output value 360 from the second VAD 344 indicating that the audio frame does not represent user speech and the frame energy value 360 for the audio frame. In some instances, when the audio frame does not represent user speech, the second energy level component 332 may calculate the second speech-energy value by decreasing the current speech-energy value and calculate the second ambient-energy value by increasing the current ambient-energy value.

The second energy level component 332 can then continue to calculate new speech-energy values and new ambient-energy values by updating a respective previous speech-energy value and a respective previous ambient-energy value using the output value 360 and the frame energy value 360 for each new audio frame. The second circuit 306 can further cause the electronic device 302 to send data 354 representing the speech-energy values and the ambient-energy values to the remote system (e.g., may send separate data 354 representing each value). In some instances, the second circuit 306 causes the electronic device 302 to send the data 354 based on detecting a wakeword using the second wakeword detection component 338 (such as by analyzing the audio signal received from the memory buffer 316 using a similar process as the first wakeword detection component 318), based on receiving user speech from a user, at given time intervals, continuously, and/or the like. Additionally, as shown in FIG. 3B, the second circuit 306 can further cause the electronic device 302 to send at least a portion of the audio signal 356 to the remote system and/or an additional remote system for analysis.

Figure 3A:
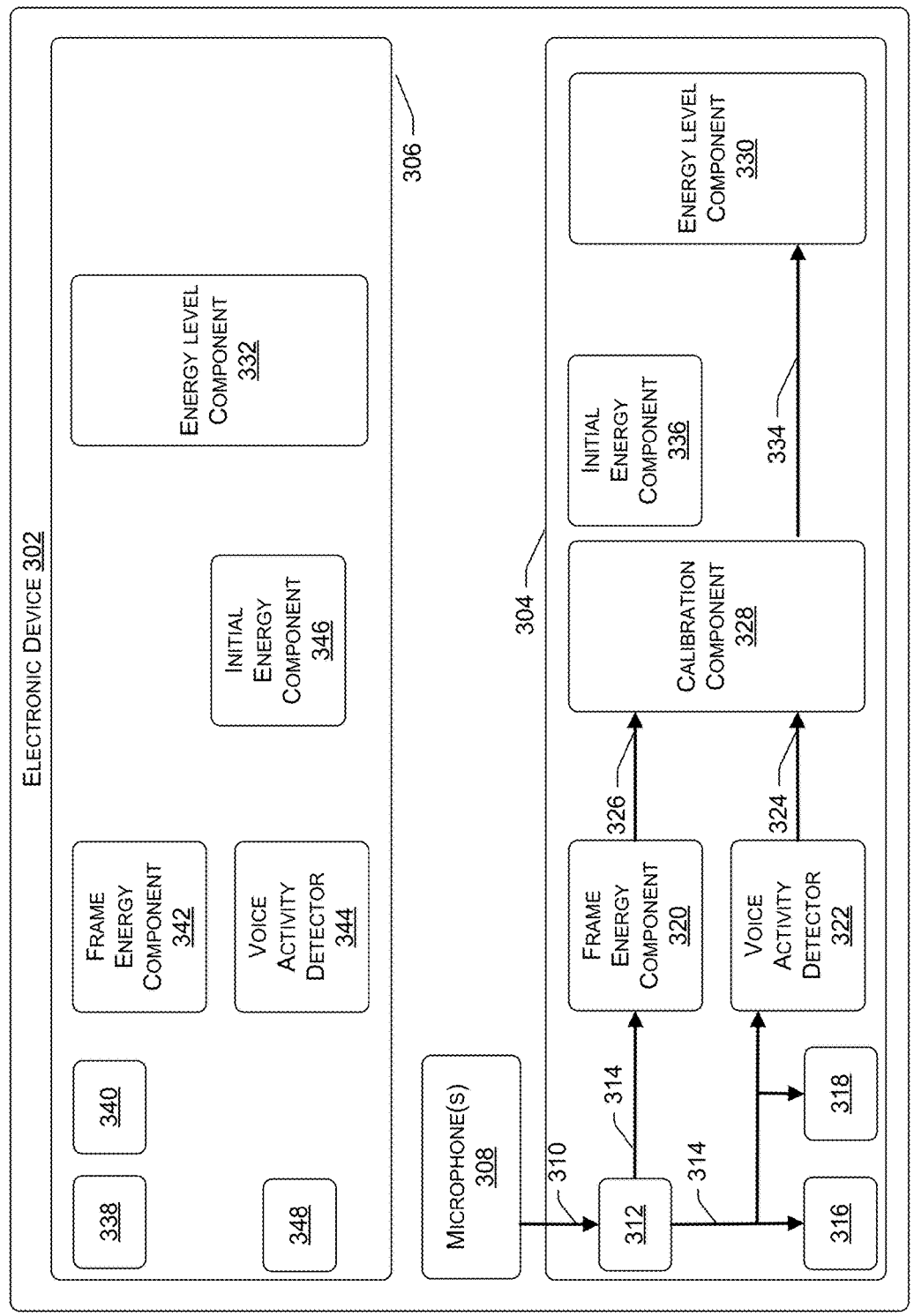
FIGS. 3A-3D are block diagrams illustrating an example of an electronic device performing a dual-stage calculation for energy levels.
Figure 3B:
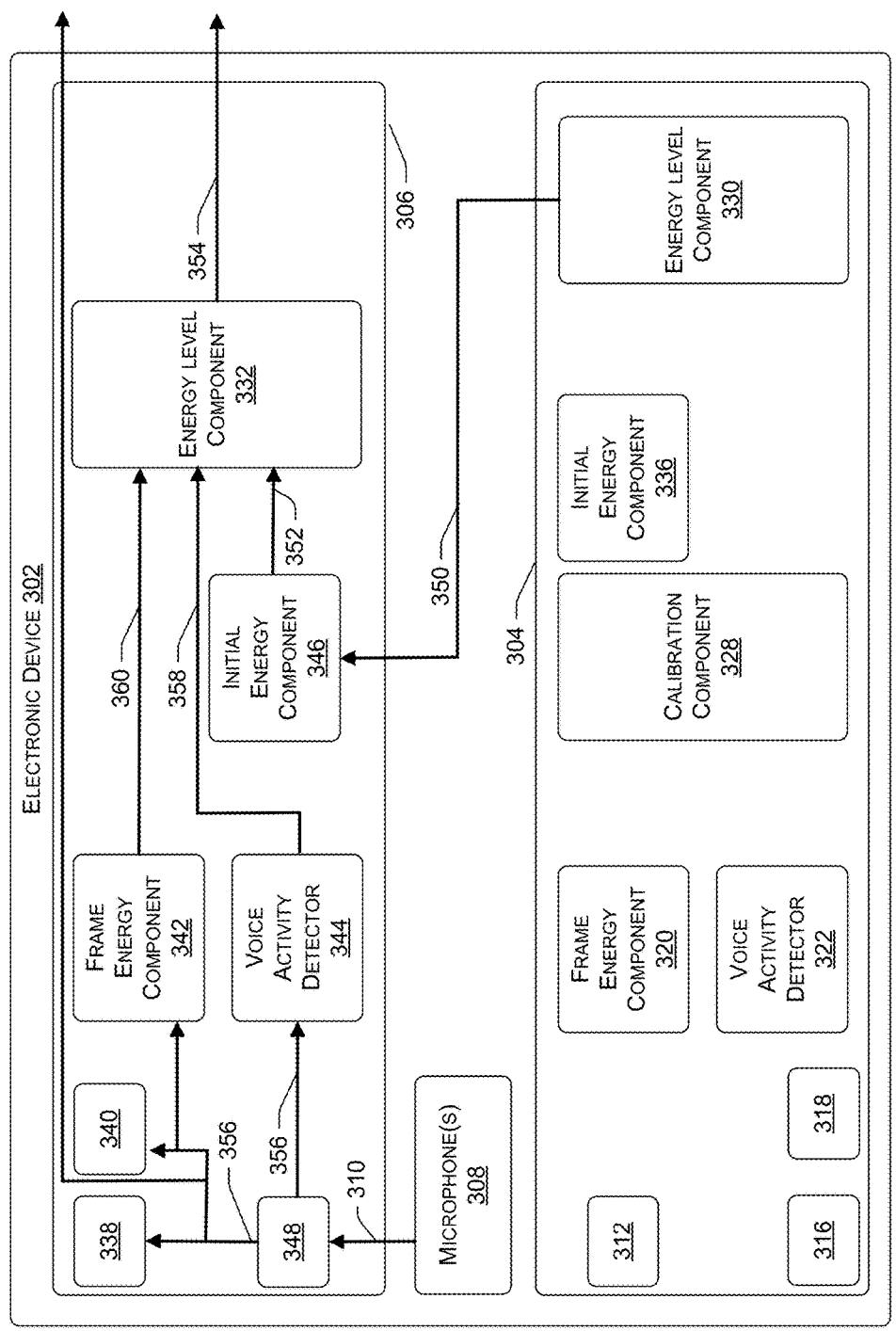
Figure 3C:
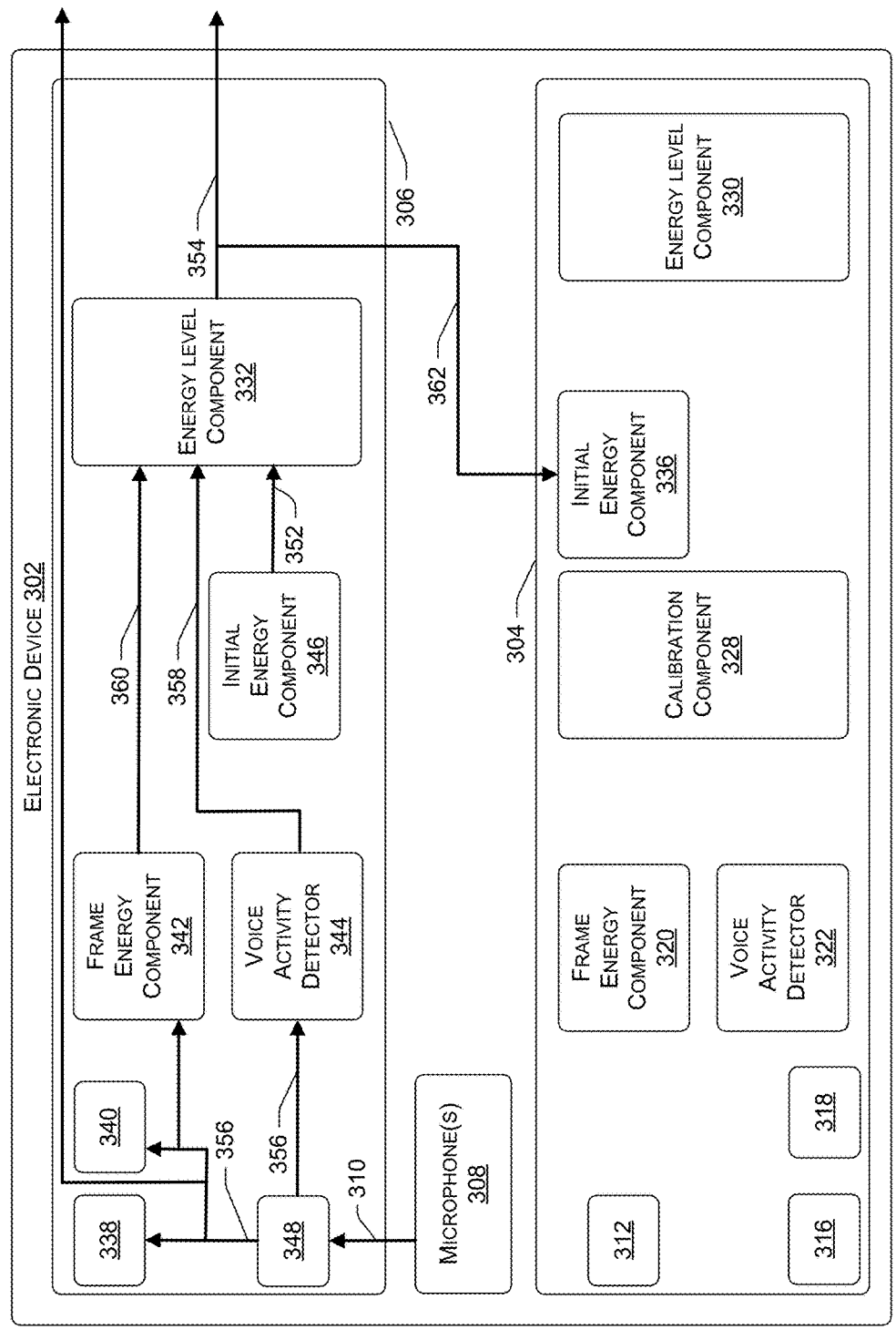

As shown in FIG. 3C, the second circuit 306 may continue to calculate the energy levels (e.g., the speech-energy values and the ambient-energy values) until the electronic device 302 (and/or similarly the second circuit 306) switches from operating in the active mode to operating in the standby mode. Based on the electronic device 302 and/or the second circuit 306 switching modes, the second circuit 306 can send the first circuit 304 the current energy levels (e.g., the current speech-energy value and the current ambient-energy value) as calculated by the second energy level component 332, which is represented by 362. For instance, the first initial energy component 336 can receive a signal indicating the current speech-energy value and the current ambient-energy value from the second circuit 306. The first circuit 304 can then use the current speech-energy value and the current ambient-energy value to continue calculating the energy levels at the electronic device 302.

Figure 3D:
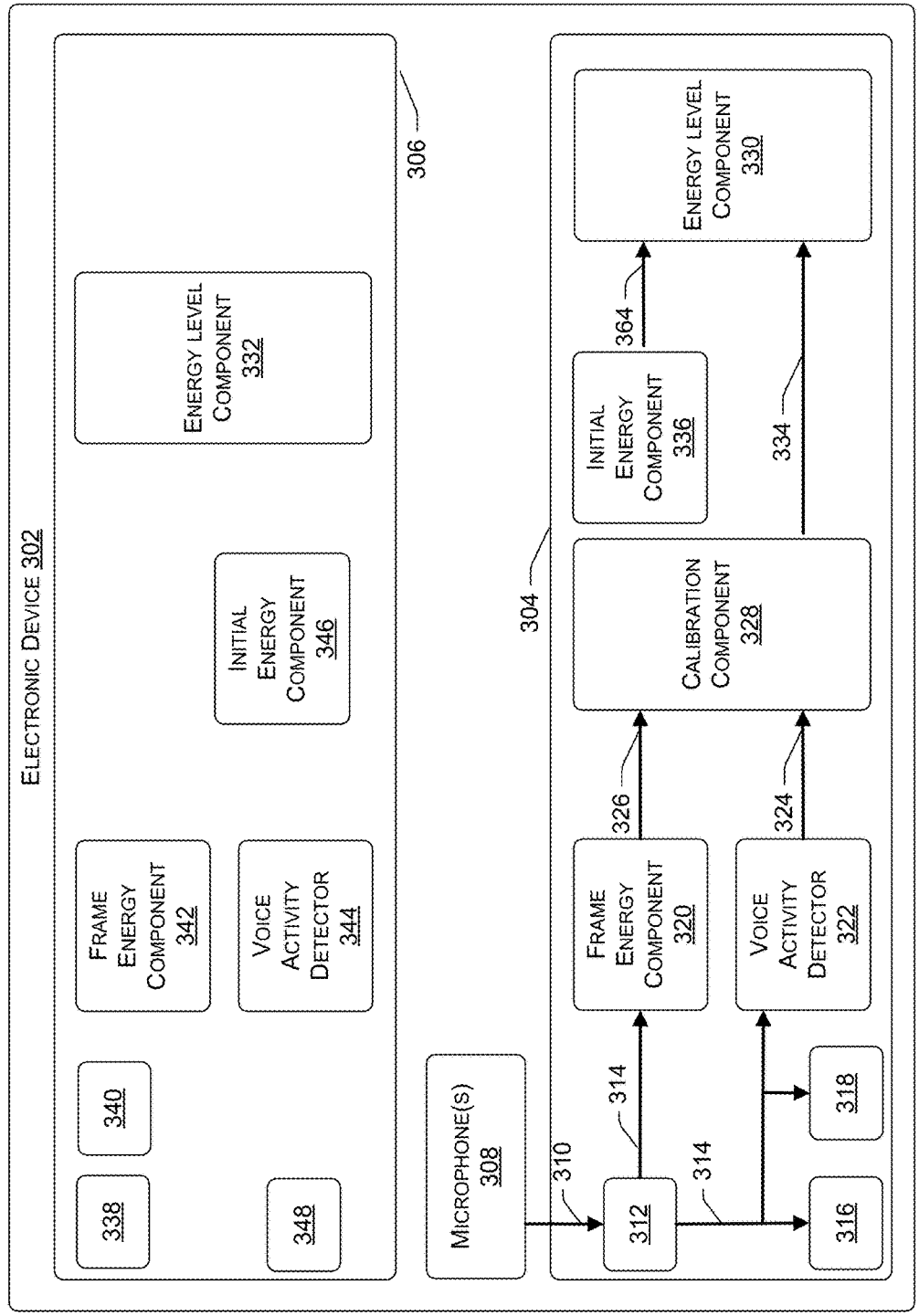

For instance, as illustrated in FIG. 3D, the first circuit 304 may once again continue calculating the speech-energy values and the ambient-energy values using a similar process as described in FIG. 3A. However, in some instances, instead of calculating an initial speech-energy value and an initial ambient-energy value using the threshold time of the audio signal 314, the first energy level component 330 may receive he current speech-energy value and the current ambient-energy value as calculated by the second circuit 306 from the first initial energy component 336, which is represented by 364. In such instances, the first energy level component 330 may respectively use the current speech-energy value and the current ambient-energy value as the initial speech-energy value and the initial ambient-energy value for the calculations.

It should be noted that, although the above example of FIGS. 3A-3D discuss the first circuit 304 as calculating initial energy levels using a threshold amount of time of an audio signal, in some instances, the second circuit 306 may calculate the initial energy levels using a threshold amount of time of an audio signal. For instance, the electronic device 302 may initially be operating in the active mode before the electronic device 302 has calculated initial energy levels. In such an instance, the second circuit 306 of the electronic device 302 can calculate the initial energy levels using a threshold amount of time of an audio signal.

It should further be noted that, in some instances, the first frame energy component 320 may calculate frame energies differently than the second frame energy component 342. For instance, since in some examples the first circuit 304 uses less power than the second circuit 306, the first frame energy component 320 may use one or more first algorithms to calculate frame energies and the second frame energy component 342 may use one or more second, different algorithms to calculate frame energies. For instance, in some examples, the first frame energy component 320 may perform calculations using fixed point arithmetic while the second frame energy component 342 performs calculations using floating point arithmetic. In such examples, the first frame energy component 320 will require less optimal computation as compared to the second frame energy component 342 and thus, will require less power.

However, in some examples, the second frame energy component 342 may perform calculations using fixed point arithmetic while the first frame energy component 320 performs calculations using floating point arithmetic. Additionally, in some examples, the first frame energy component 320 and the second frame energy component 342 may both perform calculations using fixed pint arithmetic, or the first frame energy component 320 and the second frame energy component 342 may both perform calculations using floating pint arithmetic.

Additionally, in some instances, the first VAD 322 may determine whether an audio frame represents user speech using one or more first algorithms and the second VAD 344 may determine whether an audio signal represents user speech using one or more second, different algorithms. For instance, in some examples, the first VAD 322 may perform calculations using fixed point processing while the second VAD 344 performs calculations using floating point processing. However, in other instances, the second VAD 344 may perform calculations using fixed point processing while the first VAD 322 performs calculations floating point processing. Additionally, in some examples, the first VAD 322 and the second VAD 344 may both perform calculations using fixed point processing, or the first VAD 322 and the second VAD 344 may both perform calculations using floating point processing.

In some instances, it is because the first frame energy component 320 differs from the second frame energy component 342 and/or the first VAD 322 differs from the second VAD 344 that the calibration component 328 calibrates each of the frame energy values 326 from the first frame energy component 320 and the output values 324 from the first VAD 322. In other words, in some instances, the calibration component 328 calibrates the output frame energy values 326 from the first frame energy component 320 and/or the output values 324 from the first VAD 322 to respectively be similar to the frame energy values 360 from the second frame energy component 342 and/or the output values 358 from the second VAD 344. By causing the output values from the first frame energy component 320 and/or the first VAD 322 to be respectively similar to the output values from the second frame energy component 342 and/or the second VAD 344, the calibration component 328 causes the first circuit 304 and the second circuit 306 to compute similar energy levels when the first circuit 304 and the second circuit 306 analyzes similar audio signals.

It should be noted that, although the above describes the first circuit 304 and the second circuit 306 calculating energy levels that include speech-energy values and ambient-energy values, in some instances, the first circuit 304 and the second circuit 306 may calculate any other type of energy levels that represents audio signals. In such instances, the remote system may be capable of using the calculated energy levels by the first circuit 304 and the second circuit 306 to perform the arbitration described herein.

It should be noted that, in some instances, one or more of the components illustrated in FIGS. 3A-3D can include software that performs the operations described above. For example, the first frame energy component 320 can software that computes the first frame energy values using one or more algorithms and the second frame energy component 342 can include software that computes the second frame energy values using one or more algorithms. In some instances, the one or more algorithms utilized by the first fame component 320 can be similar to the one or more algorithms utilized by the second frame component 342. Additionally, or alternatively, in other instances, the one or more algorithms utilized by the first frame component 320 can be different than the one or more second algorithms utilized by the second frame component 342.

For a second example, the first energy component 330 can include software that computes the energy levels using one or more algorithms and the second energy component 332 can include software that computes the energy levels using one or more algorithms. In some instances, the one or more algorithms utilized by the first energy level component 330 can be similar to the one or more algorithms utilized by the second energy level component 332. Additionally, or alternatively, in other instances, the one or more algorithms utilized by the first energy level component 330 can be different than the one or more second algorithms utilized by the second energy level component 332.

For a third example, the first VAD 322 can include software that computes the first values indicating if audio signal frames represent user speech using one or more algorithms (e.g., voice activity detection algorithm(s)) and the second VAD 344 can include software that computes the values indicating if audio signal frames represent user speech using one or more algorithms (voice activity detection algorithm(s)). In some instances, the one or more algorithms utilized by the first VAD 322 can be similar to the one or more algorithms utilized by the second VAD 344. Additionally, or alternatively, in other instances, the one or more algorithms utilized by the first VAD 322 can be different than the one or more second algorithms utilized by the second VAD 344.

For a fourth example, the calibration component 328 can include software that calibrates each of the values 324 from the first VAD 322 and the frame energy values from the first frame energy component 320 using one or more algorithms.

Additionally, or alternatively, in some instances, one or more of the components illustrated in FIGS. 3A-3D can include hardware that performs the operations described above. For instance, each of one or more of the components can include a circuit that receives the respective inputs described above, performs calculations using one or more respective algorithms, and outputs the respective values. In some instances, the circuit(s) can output data and/or signals representing the respective.

For example, the first frame energy component 320 can a circuit that computes the first frame energy values using one or more algorithms and the second frame energy component 342 can include a circuit that computes the second frame energy values using one or more algorithms. For a second example, the first energy component 330 can include a circuit that computes the energy levels using one or more algorithms and the second energy component 332 can include a circuit that computes the energy levels using one or more algorithms. For a third example, the first VAD 322 can include a circuit that computes the first values indicating if audio signal frames represent user speech using one or more algorithms (e.g., voice activity detection algorithm(s)) and the second VAD 344 can include circuit that computes the values indicating if audio signal frames represent user speech using one or more algorithms (voice activity detection algorithm(s)). For a fourth example, the calibration component 328 can include circuit that calibrates each of the values 324 from the first VAD 322 and the frame energy values from the first frame energy component 320 using one or more algorithms.

FIG. 4 shows an example system 400 that provides services based on spoken commands. The system has multiple electronic devices 402(1)-(2), which may each represent an electronic device 302. The electronic devices 402(1)-(2) will be referred herein simply as electronic devices 402. For purposes of discussion, two electronic devices 402 are shown, although the system 400 may include more than two electronic devices 402. Each electronic device 402 has one or more microphones that are used to capture user speech 404 from a user 406 as well as one or more speakers that are used to play speech and content. In some instances, the electronic devices 402 may be designed to operate from a fixed location, such as environment 408. Additionally, or alternatively, in some instances, the electronic devices 402 may be portable. For example, the electronic devices 402 may comprise handheld devices or other mobile devices, such as smartphones, tablet computers, media players, personal computers, wearable devices, various types of accessories, and so forth.

A user 406 is shown as interacting with a remote system 410 through the electronic devices 402. The electronic devices 402 may be located near enough to each other so that both of the electronic devices 402 may detect an utterance of the user 406. For instance, even though the user 406 is attempting to communicate with the remote system 410 via the first electronic device 402(1), the second electronic device 402(2) may capture the user speech 404 from the user 406.

In some instances, the primary mode of user interaction with the electronic devices 402 may be through speech. For example, the electronic devices 402 may receive spoken commands from the user 406 and provide services in response to the commands. The user 406 may speak a predefined wakeword (e.g., "Awake"), which may be followed by instructions or directives (e.g., "I'd like to go to a movie. Please tell me what's playing at the local cinema."). Provided services may include performing actions or activities, rendering media, obtaining and/or providing information, providing information via generated or synthesized speech via the electronic devices 402, initiating Internet-based services on behalf of the user 406, and so forth.

Sound corresponding to a spoken utterance (e.g., user speech 404) is received by each of the electronic devices 402. In certain implementations, the user request may be prefaced by a wakeword or other trigger expression that is spoken by the user 406 to indicate that subsequent user speech is intended to be received and acted upon by one of the electronic devices 402. Each electronic device 402 may detect the wakeword and interpret subsequent user speech as being directed to the respective electronic device 402. Upon detecting the keyword, the electronic devices 402 may begin providing an audio signal to the remote system 410 for detecting and responding to subsequent user utterances.

As discussed above, in some instances, each electronic device 402 may have at least one expression detector that analyzes an audio signal produced by a microphone of the respective electronic device 402 to detect the wakeword, which generally may be a predefined word, phrase, or other sound. Such an expression detector may be implemented using keyword spotting technology, as an example. A keyword spotter is a functional component or algorithm that evaluates an audio signal to detect the presence a predefined word or expression in the audio signal. Rather than producing a transcription of the words of the speech, a keyword spotter generates a true/false output to indicate whether or not the predefined word or expression was represented in the audio signal.

In certain instances, an expression detector of each electronic device 402 may be configured to analyze the audio signal to produce a score indicating a likelihood that the wakeword is represented in the audio signal. The expression detector then compares the score to a threshold to determine whether the wakeword will be declared as having been spoken.

In some cases, a keyword spotter may use simplified ASR (automatic speech recognition) techniques. For example, an expression detector may use a Hidden Markov Model (HMM) recognizer that performs acoustic modeling of the audio signal and compares the HMM model of the audio signal to one or more reference HMM models that have been created by training for a specific trigger expression (e.g., wakeword). An HMM model represents a word as a series of states. Generally, a portion of an audio signal is analyzed by comparing its HMM model to an HMM model of the trigger expression, yielding a feature score that represents the similarity of the audio signal model to the trigger expression model.

In practice, an HMM recognizer may produce multiple feature scores, corresponding to different features of the HMM models. An expression detector may use a support vector machine (SVM) classifier that receives the one or more feature scores produced by the HMM recognizer. The SVM classifier produces a confidence score indicating the likelihood that an audio signal contains the trigger expression. The confidence score is compared to a confidence threshold to make a final decision regarding whether a particular portion of the audio signal represents an utterance of the trigger expression. Upon declaring that the audio signal represents an utterance of the trigger expression, the electronic devices 402 begin transmitting respective audio signals to the remote system 410 for detecting and responding to subsequent user utterances.

As shown, each electronic device 402 receives the user speech 404 and produces a corresponding audio signal 412(1)-(2) (also referred to herein as just "audio signal 412" or "audio signals 412") and associated data 414(1)-(2) (also referred to herein as just "data 414"). Specifically, the first electronic device 402(1) produces a corresponding audio signal 412(1) and associated data 414(1), and the second electronic device 402(2) produces a corresponding audio signal 412(2) and associated data 414(2). Each of the audio signals 412(1) and 412(2) represents the same user speech 404, corresponding to the user request.

The data 414 may comprise various information that can be used to determine or infer the proximity of the user 406 relative to the respective electronic device 402 and more generally that can be used to determine which of the electronic devices 402 a speech response or other action should be directed to. Proximity in this environment may correspond to either or both of physical proximity and temporal proximity. For example, the first data 414(1) may include a first timestamp indicating the time at which the user speech 404 was received by the first electronic device 402(1), signal energy levels calculated by the first electronic device 402(1) (e.g., first speech-energy values and first ambient-energy values), parameters associated with the first electronic device 402(1) (e.g., whether the first electronic device 402(1) includes a display), or the like. Additionally, the second data 414(2) may include a second timestamp indicating the time at which the user speech 404 was received by the second electronic device 402(2), signal energy levels calculated by the second electronic device 402(2) (e.g., second speech-energy values and second ambient-energy values), parameters associated with the second electronic device 402(2) (e.g., whether the second electronic device 402(2) includes a display), or the like.

The audio signals 412 and associated data 414 are provided to the remote system 410 for analysis and responsive action. In some instances, the remote system 410 may be a network-accessible service implemented by multiple server computers that support electronic devices 402 in the homes or other premises of many different users. The electronic devices 402 may communicate with the remote system 410 over a wide-area network 416 such as the Internet. Additionally, or alternatively, one or more of the electronic devices 402 may include or provide the remote system 410.

The remote system 410 determines, based on the data 414 and other metadata that may be produced by the remote system 410 itself, which of the electronic devices 402 should receive and perform a response 418 to the user request. This is done in a way that reflects the likely intent of the user 406 to speak to a particular one of the electronic devices 402. Various techniques will described below for determining which of the electronic devices 402 the user 406 most likely wants to respond to the user request.

Generally, the remote system 410 works by first determining whether the audio signals received from the electronic devices 402 represent the same utterance, which can be performed by comparing the times at which the electronic devices 402 received the user speech 404. If the audio signals 412 do represent the same utterance, such as may be deemed to be the case when the times at which the electronic devices 402 received the user speech 404 are in close temporal proximity to each other, arbitration is performed to determine which of the electronic devices 402 should be used to provide a response to the user request represented by the audio signals.

The remote system 410 is configured to process the audio signals 412(a) and 412(b) using respective speech processing pipeline instances 420(1)-(2) (also referred to as "pipeline instance 420" or "pipeline instances 420"). Each pipeline instance 420 corresponds to one of the electronic devices 402 and to the signal 412 provided by the pipeline instance. In the illustrated example, the first pipeline instance 420(1) corresponds to the first electronic device 402(1) and to the corresponding first audio signal 412(1). The second pipeline instance 420(2) corresponds to the second electronic device 402(2) and to the corresponding second audio signal 412(2).

Each pipeline instance 420 has an ordered series of pipeline processing components configured to process the received audio signal 412. The first pipeline instance 420(1) processes the first audio signal 412(1) and corresponding first data 414(1), which are received from the first electronic device 402(1). The second pipeline instance 420(2) receives and processes the second audio signal 412(2) and corresponding second data 414(2), which are received from the second electronic device 402(2). Each pipeline instance 420 may be implemented by a different server of the remote system 410.

The processing components of each speech processing pipeline instance 420 comprise an automatic speech recognition (ASR) component 422 configured to analyze the received audio signal 412 to determine words of the spoken user request. The processing components also comprise a natural language understanding (NLU) component 424 positioned in the pipeline instance after the ASR component 422. The NLU component 424 is configured to analyze the words of the user request produced by the ASR component 422 to determine an intent expressed by the user request. The processing components also comprise a response dispatcher 426 positioned in the pipeline instance after the NLU component 424. The response dispatcher 426 is configured to determine and specify a speech response or other action corresponding to the intent of the user request based on the intent determined by the NLU component 424, and to provide the response to the corresponding electronic device 402 or instruct the corresponding electronic device 402 to perform an action in response to the user request.

Each pipeline instance 420 receives an audio signal 412 from a corresponding electronic device 402 and, unless the pipeline instance is aborted as described below, provides a response 418 to the same electronic device 402. In operation, all but one of the pipeline instances 420 are aborted before completion so that only a single one of the pipeline instances 420 returns a response 418 to its corresponding electronic device 402.

The processing components of each pipeline instance 420 comprise a first source arbiter 428(1) positioned in the pipeline instance 420 before the ASR component 422, a second source arbiter 428(2) positioned in the pipeline instance 420 after the ASR component 422 and before the NLU component 424, and a third source arbiter 428(3) positioned in the pipeline instance 420 after the NLU component 424 and before the response dispatcher 426. More specifically, the first source arbiter 428(1) is positioned in the pipeline instance 420 so that it is invoked at a time prior to initiation of ASR, and so that the ASR component is initiated as a result of the first source arbiter 428(1) producing an output. The second source arbiter 428(2) is positioned in the pipeline instance 420 so that it is invoked at a time subsequent to completion of the ASR and prior to initiation of NLU. Accordingly, the second source arbiter 428(2) is initiated based on the ASR component 422 producing an output and the NLU component 424 is initiated based on the second source arbiter 428(2) producing an output. The third source arbiter 428(3) is positioned in the pipeline instance 420 so that it is invoked at a time subsequent to completion of NLU and before invocation of the response dispatcher 426. Accordingly, the third source arbiter 428(3) is initiated based on the NLU component 424 producing an output and the response dispatcher 426 is initiated based on the third source arbiter 428(3) producing an output.

Each source arbiter 428(1)-(3) is configured to determine whether one or more criteria are satisfied, wherein the criteria relate to and indicate whether the electronic device 402 corresponding to the pipeline instance 420 should or will be the device that is used to provide a response to the user request. The criteria may be based at least in part on the data 414 received from the corresponding electronic device 402. Although three arbiters are shown and discussed in connection with some instances herein, other instances may include one, two or more arbiters, and/or other devices that function similar to or provide a subset of the functionality discussed in connection with source arbiters 428(1)-(3).

As one example, the first data 414(1) may comprise a first timestamp corresponding to the time that the user speech 404 was received by the first electronic device 402(1) and the second data 414(2) may comprise a second timestamp corresponding to the time that the user speech 404 was received by the second electronic device 402(2). In some instances, each arbiter 428(1)-(3) of the first pipeline instance 420(2) may be configured to abort the second pipeline instance 420(2) in response to (a) determining that the difference between the first timestamp and the second timestamp is less than a threshold, indicating that the sound representing the user speech 404 was received by each of the electronic devices 402 at close to the same time, and (b) determining that the second timestamp is greater than the first timestamp, indicating that the second electronic device 402(2) received or detected the user utterance later than the first electronic device 402(1). Note that in these examples the timestamp may correspond to the time at which a prefacing wakeword was detected by the respective electronic device 402.

As another example, the data 414 may comprise one or more signal attributes. For example, a signal attribute may indicate the amplitude of the audio signal, the ambient-energy value, the speech-energy value, the confidence level with which a wakeword was detected in the audio signal, the physical distance of the user 406 from the electronic device 402, and so forth. Each arbiter 428(1)-(3) of the second pipeline instance 420(2) may be configured to compare attributes regarding the first audio signal 412(1) with corresponding attributes of the second audio signal 412(2) and to abort the second pipeline instance 420(2) as a result of a negative comparison. For example, the second pipeline instance 420(2) may be aborted if the second audio signal 412(2) has a lower amplitude than that of the first audio signal 412(1). Similarly, the second pipeline instance 420(2) may be aborted if the second audio signal 412(2) has a lower signal-to-noise ratio, voice presence, wakeword detection confidence level, or user distance than that of the first audio signal 412(1).

As specific examples, determining which of first and second electronic devices 402 will respond to a user utterance, where the first and second electronic devices 402 provide first and second audio signals respectively, may comprise one or more of the following:
(1) determining which of the first audio signal and the second audio signal has a higher strength or amplitude;
(2) determining which of the first device and the second device detects a higher level of voice presence or which of the first audio signal and the second audio signal represents a higher level of voice presence;
(3) determining which of the first audio signal and the second audio signal has a higher signal-to-noise measurement;
(4) determining which of the first device and the second device detects a trigger expression with a higher level of confidence;
(5) determining which of the first device and the second device first detects the trigger expression;
(6) determining which of the first device and the second device has a particular capability;
(7) determining within which of the first audio signal and the second audio signal words are recognized with a higher level of confidence;
(8) determining within which of the first audio signal and the second audio signal an intent expressed by the words is determined with a higher level of confidence;
(9) determining which of the first device and the second device is physically nearer a user;
(10) determining which of the first device and the second device first receives a response to an utterance; or
(11) determining which of the first and second devices first receives the utterance.

More generally, each of the source arbiters 428(1)-(3) may abort its pipeline instance 420 upon determining that the electronic device 402 associated with the pipeline instance 420 is not the one to which a response should be provided. When operation of a processing pipeline instance is aborted, the aborted pipeline instance does not provide a response 418 to the corresponding electronic device 402. For instance, the aborted pipeline instance 420(2) may also provide a message to the second electronic device 402(2) indicating that the second electronic device 402(2) will not be used to provide a response to the user request. In response, the second electronic device 402(2) may stop providing the second audio signal 412(2) to the remote system 410.

As an example, the message or other indication may comprise data including an instruction that causes or results in the second electronic device 402(2) entering a standby mode. As discussed above, a standby mode is a mode in which the second electronic device 402(2) is not sending the second audio signal 412(2) to the remote system 410 and in which the second electronic device 402(2) monitors its environment to detect a further utterance of the wakeword. In some cases, an error response may be returned to the second electronic device 402(2) corresponding to the aborted pipeline instance. In some cases, the second electronic device 402(2) may be instructed to play a tone, produce an LED illumination, or take some other action indicating that the second electronic device 402(2) is not going to respond to the user request.

The remote system 410 may support electronic devices 402 in the homes of many different users. It is assumed in this description that the user 406 has provided configuration information indicating a group of electronic devices 402 that are associated with each other and that are to be handled collectively in the manner described herein. For example, the user 406 may register each of his or her electronic devices 402, or a set of such electronic devices 402 that are commonly located, as being associated with a single user 406 or household account. More specifically, the user 406 may maintain an account with a network-based service provider that provides the remote system 410 and that supports the operations of many different electronic devices. An account may be configured to store information for multiple user profiles, corresponding to different members of a household. Each user profile may indicate characteristics and preferences of a particular user. A user or household may register many different types of electronic devices as being associated with an account. The account may be configured to store payment information, purchase information, subscriptions, contact information, etc. The account may also be configured to store information about speech electronic devices within a household, such as their locations, their associated profiles, etc.

The actions described herein are performed with respect to a group of electronic devices 402 that have been associated with each other in a manner such as this. Furthermore, although the description herein is given in the context of two electronic devices 402, any number of two or more electronic devices 402 may be used and handled in the same manner.

The remote system 410 may be part of one or more network-accessible computing platforms that are maintained and accessible via the Internet, such as are sometimes referred to as "cloud" services. Generally, communications between the electronic devices 402 and the remote system 410 may be implemented through a combination of various types of data communications networks, including local-area networks, wide-area networks, and/or the public Internet, which may include various types of wireless networks including Wi-Fi networks, Bluetooth networks, and cellular communication networks.

Figure 5:
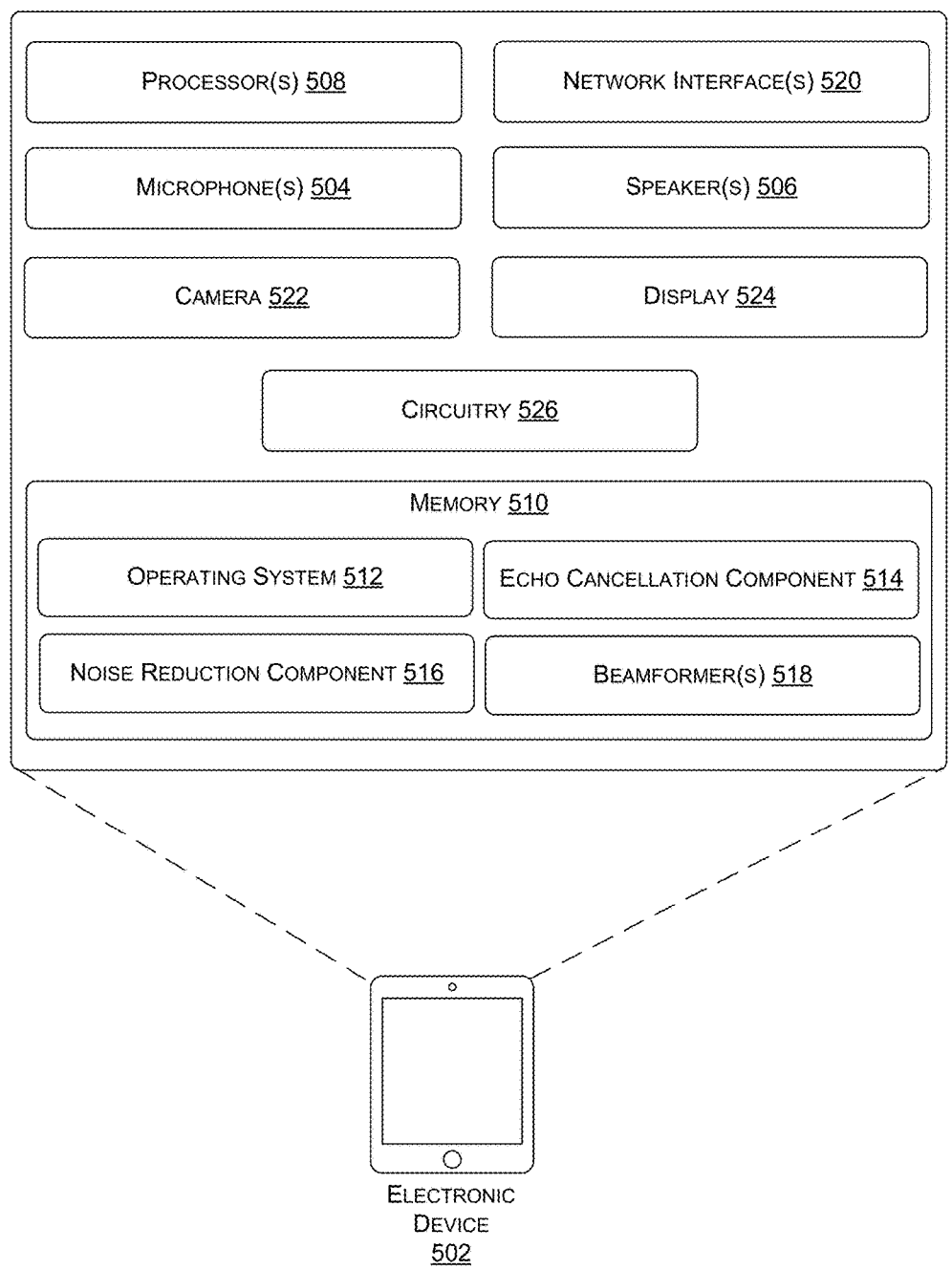
FIG. 5 is a block diagram showing relevant components of an example electronic device.

FIG. 5 shows relevant components of an electronic device 502, which may represent the electronic device 302. The electronic device 502 includes microphone(s) 504 and speaker(s) 506 that facilitate audio interactions with the user. The microphone(s) 504 produce microphone audio signals representing audio from the environment of the electronic device 502 such as sounds uttered by the user. The microphone audio signals produced by the microphone(s) 504 may comprise directional audio signals or may be used to produce directional audio signals, where each of the directional audio signals emphasizes audio from a different radial direction relative to the microphone(s) 504.

Although the electronic device 502 is described as having speaker(s) 506, in other instances, the electronic device 502 may not include speaker(s) 506. For example, the electronic device 502 may comprise microphone(s) 504 into which a user speaks to issue commands or may comprise an electronic device for connection to another appliance such as a television. Instead of an integrated speakers, instances such as this may use speaker capabilities of other devices, including other electronic devices that do have speakers and different types of dedicated speaker components. As one example, the electronic device 502 may produce an audio output signal that drives an external speaker. As another example, the electronic device 502 may drive or control an external speaker through a wireless data connection such as a Bluetooth connection. In other situations, the electronic device 502 may be used in conjunction with a speaker device that receives audio signals and other instructions from the remote server, rather than from the electronic device 502.

The electronic device 502 may comprise processor(s) 508 and associated memory 510. The processor(s) 508 may comprise one or more processors, which may include general-purpose processors, specialized processors, processing cores, digital signal processors, etc. Depending on the configuration of the electronic device 502, the memory 510 may be a type of non-transitory computer storage media and may include volatile and nonvolatile memory. The memory 510 may include, but is not limited to, RAM, ROM, EEPROM, flash memory, or other memory technology. The memory 510 may include removable or detachable memory and may also include network-accessible memory. The memory 510 may include portable storage media such as a flash memory drive.

The memory 510 may be used to store any number of software components that are executable by the processor(s) 508. Software components stored in the memory 510 may include an operating system 512 that is configured to manage hardware and services within and coupled to the electronic device 502. In addition, executable components stored by the memory 510 may include audio processing components configured to produce an audio signal using the microphone(s) 504. The audio processing components may include functionality for processing microphone audio signals generated by the microphone(s) 504 and/or output audio signals provided to the speaker(s) 506. As an example, the audio processing components may include an acoustic echo cancellation or suppression component 514 for reducing acoustic echo generated by acoustic coupling between the microphone(s) 504 and the speaker(s) 506. The audio processing components may also include a noise reduction component 516 for reducing noise in received audio signals, such as elements of microphone audio signals other than user speech.

The audio processing components may include one or more audio beamformer(s) 518 configured to generate directional audio signals that are focused in different directions. More specifically, the beamformer(s) 518 may be responsive to audio signals from spatially separated microphone elements of the microphone(s) 504 to produce directional audio signals that emphasize sounds originating from different areas of the environment of the electronic device 502 or from different directions relative to the electronic device 502. The beamformer(s) 518 may in some cases produce metadata that may be used in arbitration. For example, the beamformer(s) 518 may indicate a signal strength of voice activity level corresponding to each directional audio signal.

The electronic device 502 may have network interface(s) 520 such as a wireless or Wi-Fi network communications interface, an Ethernet communications interface, a cellular network communications interface, a Bluetooth communications interface, etc., for communications with the remote system over various types of networks, including wide-area network, local-area networks, private networks, public networks etc. In the case of a wireless communications interfaces, such interfaces may include radio transceivers and associated control circuits and logic for implementing appropriate communication protocols.

As shown, the electronic device 502 may further have a camera 522 and a display 524. The camera 522 may be any device that can record visual images in the form of photographs, film, or video signals. In one exemplary, non-limiting example, the camera 522 is a digital camera that encodes digital images and videos digitally and stores them on local or cloud-based memory. The camera 522 may, in some examples, be configured to capture photographs, sequences of photographs, rapid shots (e.g., multiple photographs captured sequentially during a relatively small temporal duration), videos, or any other type of image, or any combination thereof. In some instances, the electronic device 502 may include multiple cameras, such as one or more front-facing cameras and/or one or more rear facing cameras. In some instances, the camera 522 may be optional for the electronic device 502. For instance, the camera 522 may be external to, and in communication with, the electronic device 502.

The display 524 may be any device that can output data in a visual form. Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Still further, a touch screen may, in some instances, correspond to a display device including capacitive sensing panels capable of recognizing touch inputs thereon. For instance, the display 524 may correspond to a projected capacitive touch ("PCT"), screen include one or more row traces and/or driving line traces, as well as one or more column traces and/or sensing lines. In some instances, the display 524 may be an optional component for the electronic device 502.

As also shown in FIG. 5, the electronic device 502 includes circuitry 526. The circuitry 526 can include each of the circuits described above. For instance, the circuitry can include at least the first circuit and the second circuit as shown in FIGS. 3A-3D.

Figure 6:
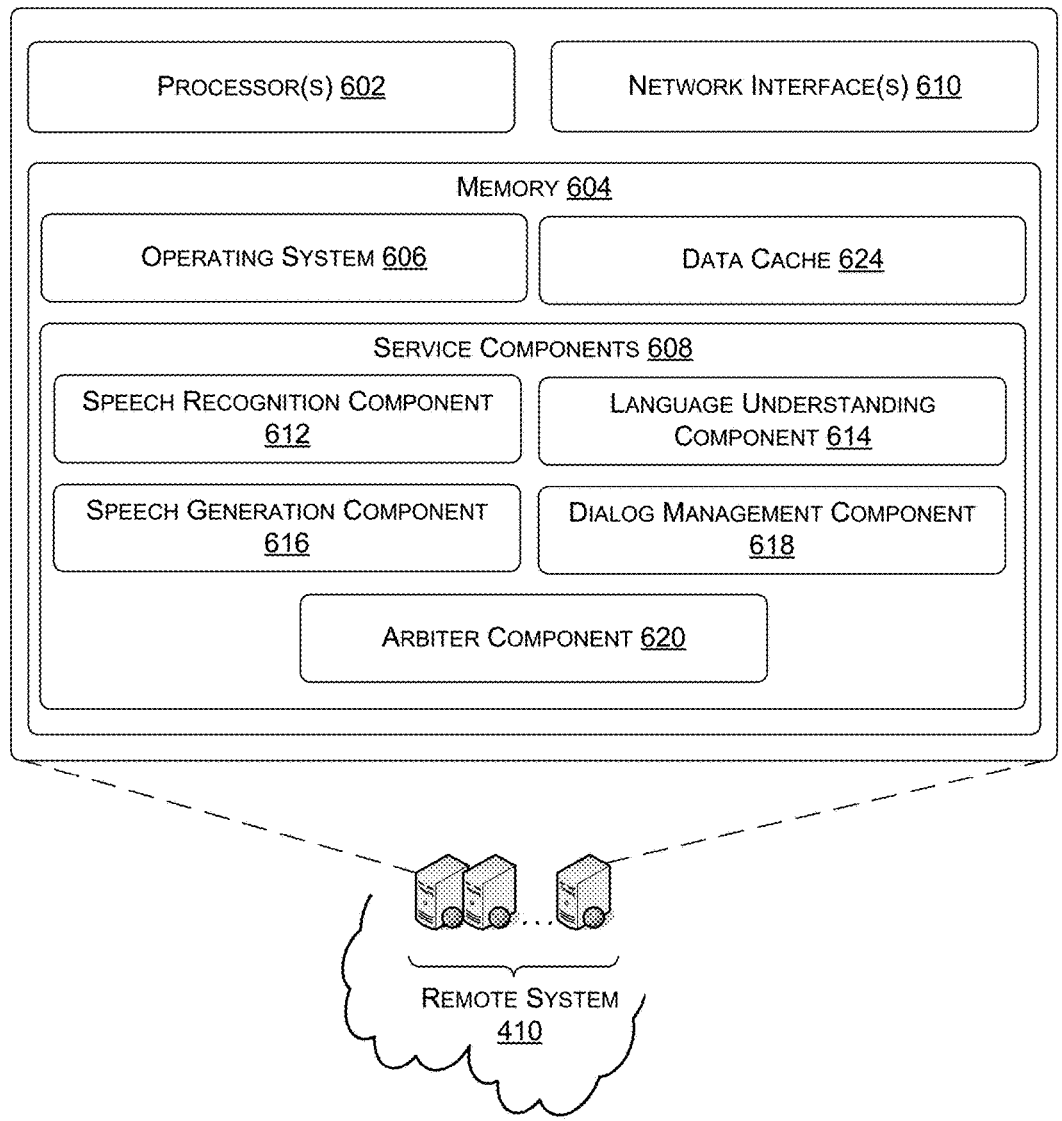
FIG. 6 is a block diagram showing relevant components of an example remote system that may be used in part to implement a speech service.
Figure 7A:
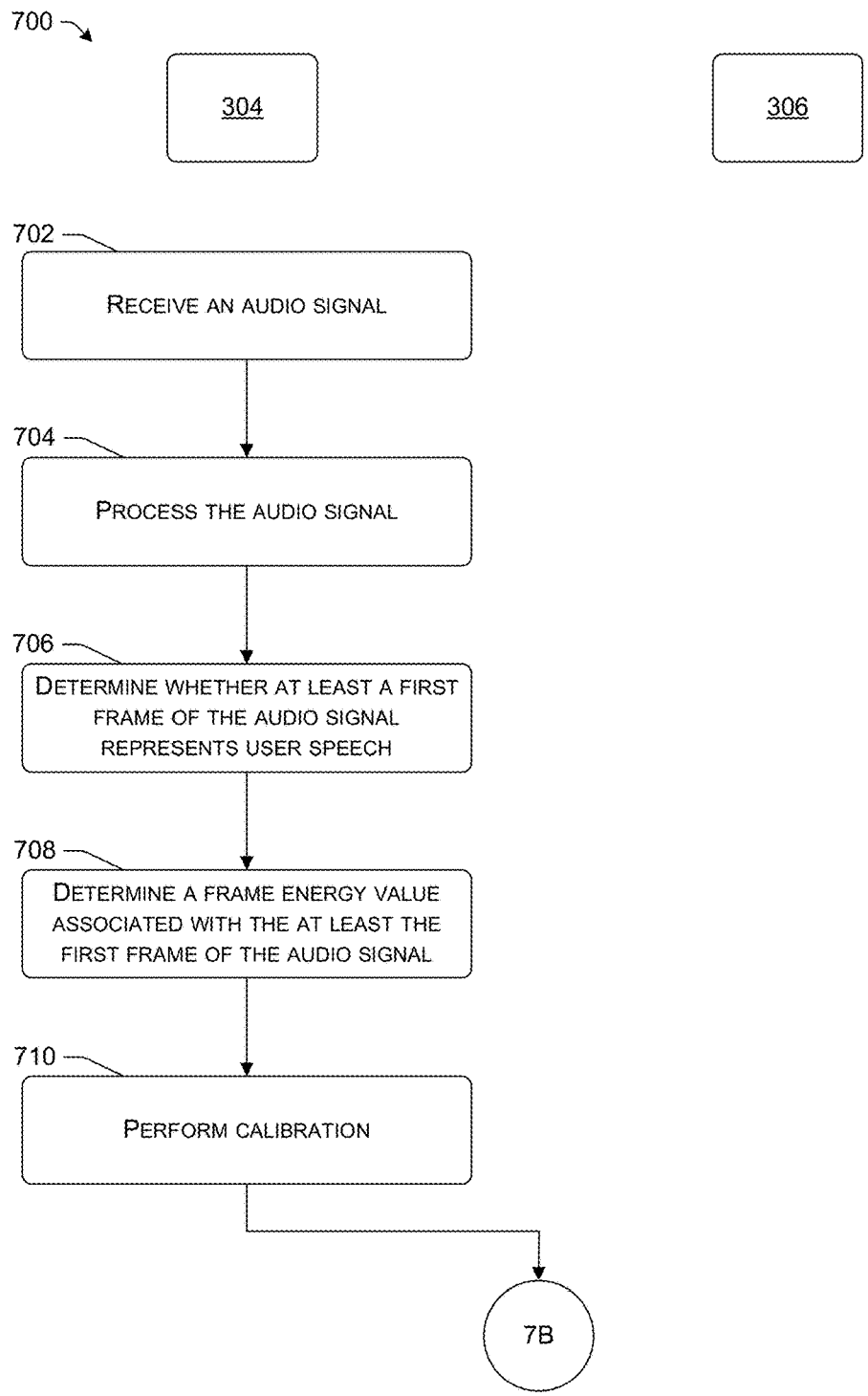
FIGS. 7A-7D illustrate an example process of an electronic device performing dual-stage calculations for energy levels.
Figure 7B:
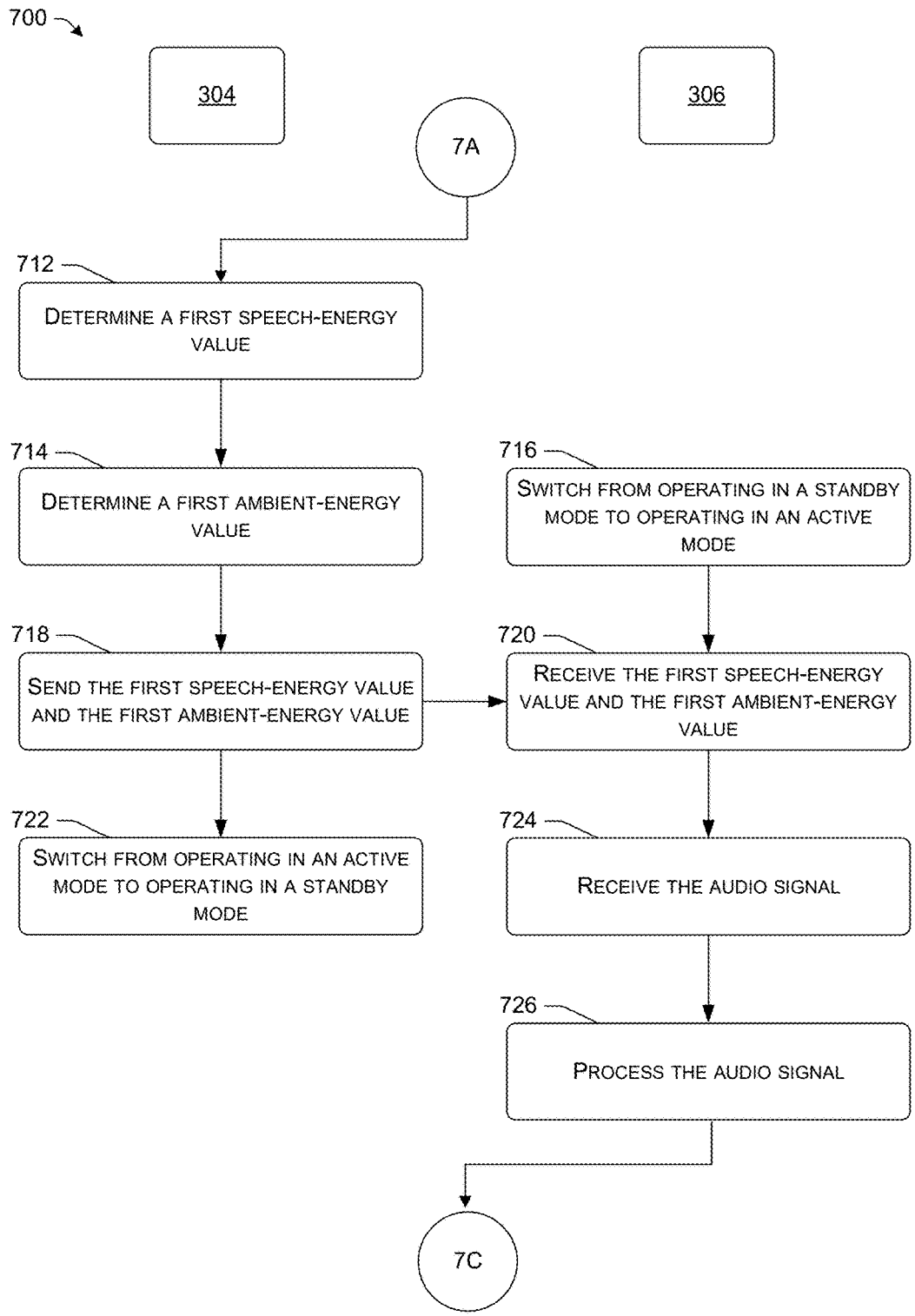
Figure 7C:
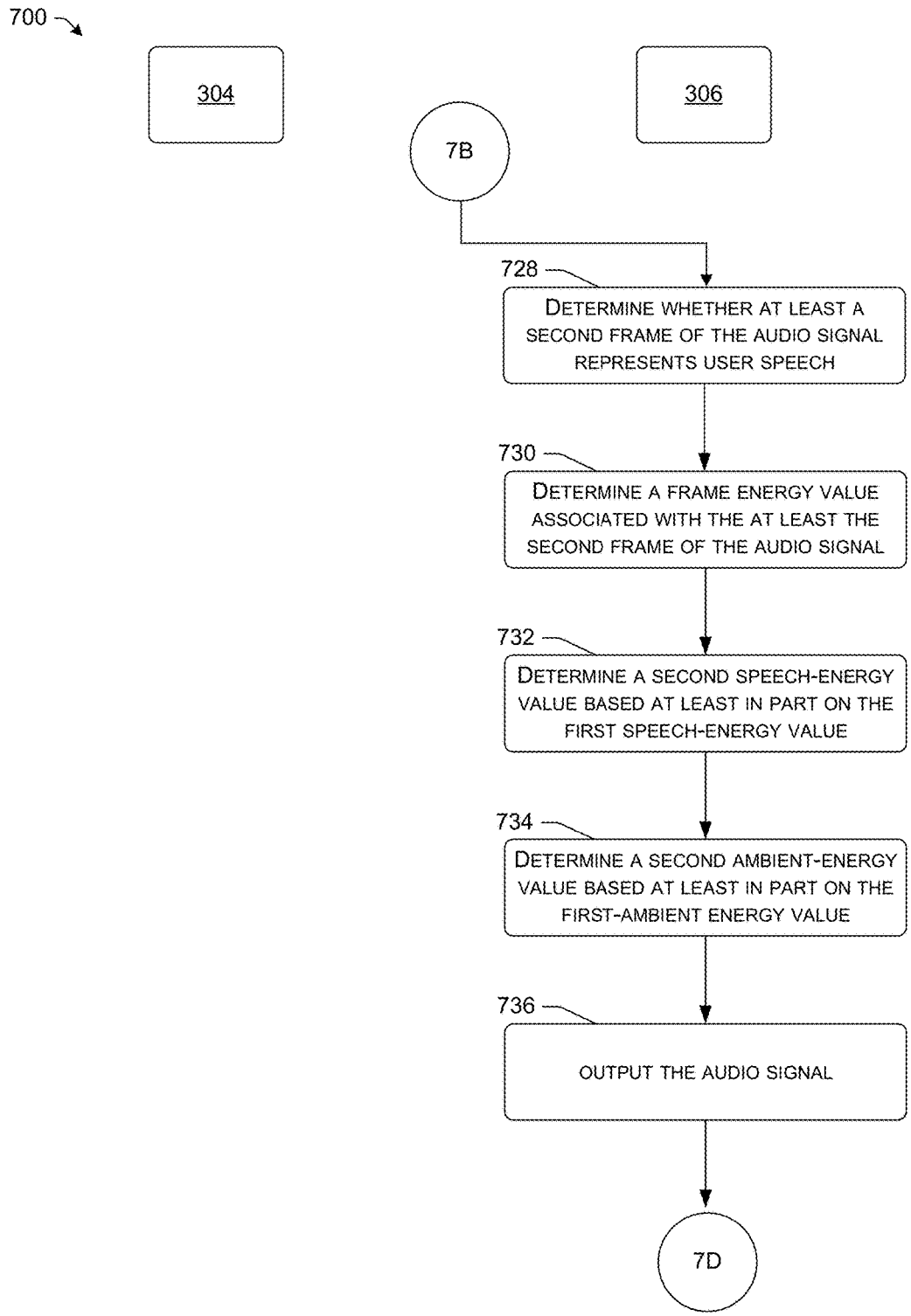
Figure 7D:
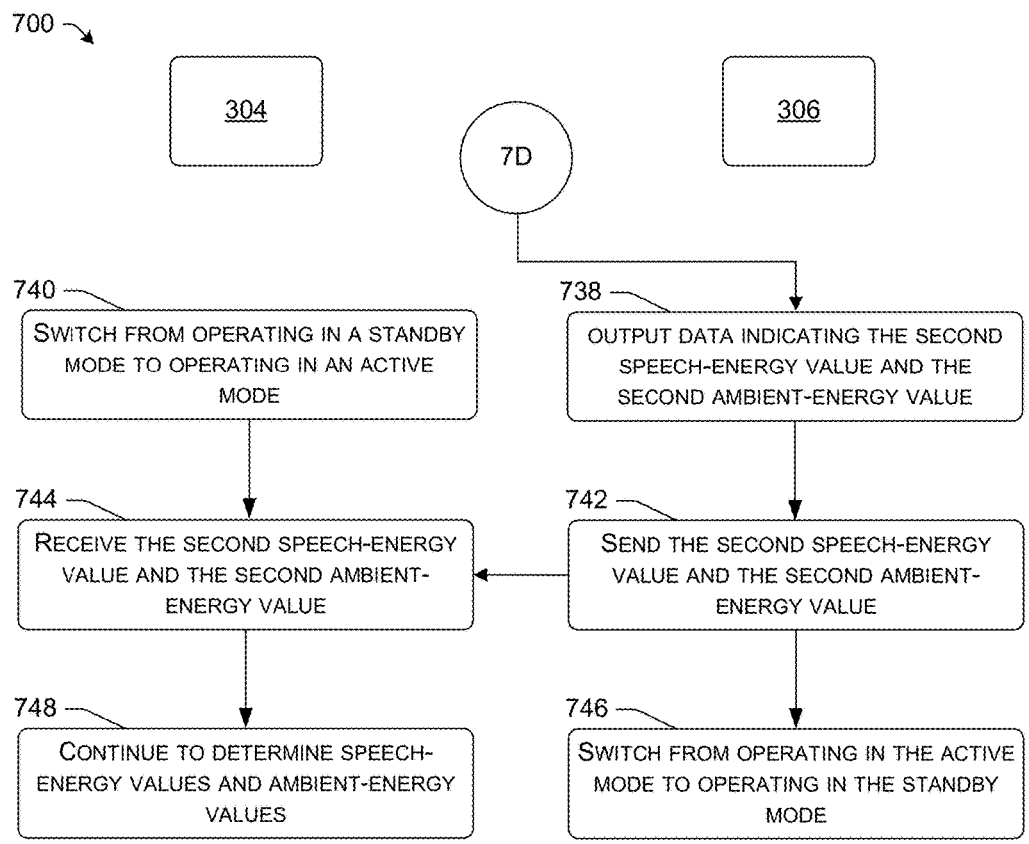

FIG. 6 illustrates examples of relevant logical or functional components of the remote system 410 that may be used to implement the speech services described herein. Generally, the remote system 410 may be implemented by one or more servers, with various functionality duplicated or distributed in various ways across the different servers. Servers may be located together or separately, and organized as virtual servers, server banks, and/or server farms. The functionality described herein may be provided by the servers of a single entity or enterprise, or may utilize the servers and/or services of multiple entities or enterprises. Furthermore, the described speech services may be part of a larger infrastructure that provides various types of functions and services to multiple users, not limited to the functions and services described herein.

In a very basic configuration, the example remote system 410 may comprise a processor(s) 602 and associated memory 604. The processor(s) 602 may comprise one or more processors, which may include general-purpose processors, specialized processors, processing cores, digital signal processors, etc. Depending on the configuration of the remote system 410, the memory 604 may be a type of non-transitory computer storage media and may include volatile and nonvolatile memory. The memory 604 may include, but is not limited to, RAM, ROM, EEPROM, flash memory, or other memory technology. The memory 604 may include removable or detachable memory and may also include network-accessible memory. The memory 604 may include portable storage media such as a flash memory drive.

The memory 604 may be used to store any number of software components that are executable by the processor(s) 602. Software components stored in the memory 604 may include an operating system 606 that is configured to manage hardware and services within and coupled to the remote system 410. In addition, executable software components stored by the memory 604 may include service components 608 that support the speech-based operations of the electronic devices described herein. The remote system 410 may also have a network interface(s) 610, such as an Ethernet communications adapter, for communicating with other servers, other networked components, and with multiple electronic devices, which may be located in the homes or other premises of many different users. In some instances, the network interface(s) 610 can include one or more network interface controllers (NICs) or other types of transceiver devices to send and receive communications over a network.

For instance, the network interface(s) 610 may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, each of the network interface(s) 610 may include a wide area network (WAN) component to enable communication over a wide area network. The network may represent an array of wired networks, wireless networks, such as WiFi, or combinations thereof.

The components of the service components 608 receive one or more audio signals that have been processed by an electronic device and perform various types of processing in order to understand the intent or meaning expressed by user speech. Generally, the speech components 608 are configured to (a) receive a signal representing user speech, (b) analyze the signal to recognize the user speech, (c) analyze the user speech to determine a meaning of the user speech, and (d) generate output speech that is responsive to the meaning of the user speech.

The service components 608 may include an automatic speech recognition (ASR) component 612 that recognizes human speech in the received audio signal. The ASR component 612 creates a transcript of words represented in the directional audio signals. The service components 608 may also include a natural language understanding (NLU) component 614 that is configured to determine user intent based on recognized speech of the user. The NLU component 614 analyzes a word stream provided by the ASR component 612 and produces a representation of a meaning of the word stream. For example, the NLU component 614 may use a parser and associated grammar rules to analyze a sentence and to produce a representation of a meaning of the sentence in a formally defined language that conveys concepts in a way that is easily processed by a computer. The meaning may be semantically represented as a hierarchical set or frame of slots and slot values, where each slot corresponds to a semantically defined concept. NLU may also use statistical models and patterns generated from training data to leverage statistical dependencies between words in typical speech.

The service components 608 may be implemented in part by a text-to-speech or speech generation component 616 that converts text to audio for generation at speaker(s) of electronic devices.

The service components 608 may also include a dialog management component 618 that is responsible for conducting speech dialogs with the user in response to meanings of user speech determined by the NLU component 614. The dialog management component 618 may include domain logic that is used to analyze the meaning of user speech and to determine how to respond to the user speech. The dialog management component 618 may define rules and behaviors relating to different information or topic domains, such as news, traffic, weather, to-do lists, shopping lists, music, home automation, retail services, and so forth. The domain logic maps spoken user statements to respective domains and is responsible for determining dialog responses and/or actions to perform in response to user utterances.

The service components 608 may include an arbiter component 620 that determines whether a response should be provided to a received audio signal representing user speech, based at least in part on cached data regarding other audio signals as described above. For instance, the arbiter component 620 may analyze audio signals and data received from multiple electronic devices in order to select one of the electronic devices to respond to a user. For instance, the arbiter component 620 may be used to for the arbitration described in FIG. 4.

The memory 604 may include a data cache 624 in which data can be cached by the remote system 410 that implement different processing pipeline instances. In practice, the data 624 cache may be implemented by a storage server that is accessible to the remote system 410 and multiple speech processing pipeline instances implemented by the remote system 410.

FIGS. 7A-7D illustrate an example process 700 of an electronic device performing dual-stage calculations using multiple circuits. The process 700, as well as each process described herein, is illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. Additionally, any number of the described blocks can be optional and eliminated to implement the processes.

At 702, the process 700 receives, using a first circuit 304, an audio signal and at 704, the process 700 processes, using the first circuit 304, the audio signal. For instance, an electronic device may generate an audio signal representing sound using at least one microphone. Based on the electronic device operating in a standby mode, the first circuit 304 of the electronic device, which may use less power than a second circuit 306 of the electronic device, can then receive and process the audio signal. For instance, the first circuit 304 can process the audio signal using one or more of echo cancellation, beamforming, gain control, beam selection, or the like. Additionally, the first circuit 304 can process the audio signal by converting the audio signal from an analog audio signal to a digital audio signal.

At 706, the process 700 determines, using the first circuit 304, whether at least a first frame of the audio signal represents user speech. For instance, the first circuit 304 may utilize a first VAD to analyze frames of the audio signal to determine whether each frame represents user speech. Based on determining that the first frame represents user speech, the first VAD can generate and output a first value representing a status of the first frame, where the status indicates that the first frame represents user speech. Alternatively, based on determining that the first frame does not represent user speech, the first VAD can generate and output a second value representing a different status of the first frame, where the different status indicates that the first frame does not represent user speech.

At 708, the process 700 determines, using the first circuit 304, a frame energy value associated with the at least the first frame of the audio signal and at 710, the process 700 performs, using the first circuit 304, calibration. For instance, the first circuit 304 may utilize a first frame energy component to analyze the frames of the audio signal to determine a respective frame energy value associated with each frame. The first frame energy component can then generate and output a frame energy value for the first frame. A calibration component of the first circuit 304 may receive the output values from each of the first VAD and the first frame energy component, calibrate the values, and output the calibrated values to a first energy level component.

At 712, the process 700 determines, using the first circuit 304, a first speech-energy value. For instance, the first circuit 304 may utilize a first energy level component to analyze the output values from each of the first VAD and the first frame energy component (which may be calibrated) in order to calculate speech-energy values at the electronic device. For example, based on the output value from the first VAD indicating that the first frame does not represent user speech, the first energy level component may calculate the first speech-energy value by reducing a previously determined speech-energy value based on the first frame energy value. Additionally, for another example, based on the output value from the first VAD indicating that the first frame represents user speech, the first energy level component may calculate the first speech-energy value by increasing the previously determined speech-energy value based on the first frame energy value.

At 714, the process 700 determines, using the first circuit 304, a first ambient-energy value. For instance, the first circuit 304 may utilize the first energy level component to analyze the output values from each of the first VAD and the first frame energy component (which may be calibrated) in order to calculate ambient-energy values at the electronic device. For example, based on the output value from the first VAD indicating that the first frame does not represent user speech, the first energy level component may calculate the first ambient-energy value by increasing a previously determined ambient-energy value based on the first frame energy value. Additionally, for another example, based on the output value from the first VAD indicating that the first frame represents user speech, the first energy level component may calculate the first ambient-energy value by decreasing a previously determined ambient-energy value based on the first frame energy value.

At 716 the process 700 switches a second circuit 306 from operating in a standby mode to operating in an active mode. For instance, the first circuit 304 may analyze the audio signal and determine that that the audio signal represents a wakeword. In response, the first circuit 304 may output a switch signal that causes the second circuit 306 to switch from operating in the standby mode to operating in the active mode. In some instances, the second circuit 306 may then receive at least a portion of the audio signal from the first circuit, and then analyze the at least the portion of the audio signal to determine that the at least the portion of the audio signal does represent the wakeword. In some instances, the second circuit 306 can the then output a switch signal that causes the electronic device to switch from operating in a standby mode to operating in an active mode.

At 718, the process 700 sends, using the first circuit 304, the first speech-energy value and the first ambient-energy value and at 720, the process 700 receives, using the second circuit 306, the first speech-energy value and the first ambient-energy value. For instance, based on the electronic device and/or second circuit 306 switching from the standby mode to the active mode, the first circuit 304 can send the second circuit 306 the first speech-energy value and the first ambient-energy value. In some instances, the first circuit 304 can further send the second circuit 306 at least a portion of the audio signal with a marker that indicates the last frame of the audio signal that the first circuit 304 analyzed.

At 722, the process 700 switches the first circuit 304 from operating in an active mode to operating in a standby mode. For instance, based on the electronic device and/or second circuit 306 switching from the standby mode to the active mode, the first circuit 304 can switch to the standby mode in order to save power on the electronic device.

At 724, the process 700 receives, using the second circuit 306, the audio signal and at 726, the process 700 processes, using the second circuit 306, the audio signal. For instance, based on the electronic device and/or the second circuit 306 operating in the active mode, the second circuit 306 can begin to receive and process the audio signal. For instance, the second circuit 306 can process the audio signal using one or more of echo cancellation, beamforming, gain control, beam selection, or the like. Additionally, the second circuit 306 can process the audio signal by converting the audio signal from an analog audio signal to a digital audio signal.

At 728, the process 700 determines, using the second circuit 306, whether at least a second frame of the audio signal represents user speech. For instance, the second circuit 306 may utilize a second VAD to analyze frames of the audio signal to determine whether each frame represents user speech. Based on determining that the second frame represents user speech, the second VAD can generate and output a first value representing a status of the second frame, where the status indicates that the second frame represents user speech. Alternatively, based on determining that the second frame does not represent user speech, the second VAD can generate and output a second value representing a different status of the second frame, where the different status indicates that the second frame does not represent user speech.

At 730, the process 700 determines, using the second circuit 306, a frame energy value associated with the at least the second frame of the audio signal. For instance, the second circuit 306 may utilize a second frame energy component to analyze the frames of the audio signal to determine a respective frame energy value associated with each frame. The second frame energy component can then generate and output the frame energy for the second frame.

At 732, the process 700 determines, using the second circuit 306, a second speech-energy value based at least in part on the first speech-energy value. For instance, the second circuit 306 may utilize a second energy level component to analyze the output values from each of the second VAD and the second frame energy component in order to calculate speech-energy values at the electronic device. For example, based on the output value from the second VAD indicating that the second frame does not represent user speech, the second energy level component may calculate the second speech-energy value by reducing the first speech-energy value based on the second frame energy. Value. Additionally, for another example, based on the output value from the second VAD indicating that the second frame represents user speech, the second energy level component may calculate the second speech-energy value by increasing the first speech-energy value based on the second frame energy value.

At 734, the process 700 determines, using the second circuit 306, a second ambient-energy value based at least in part on the first ambient-energy value. For instance, the second circuit 306 may utilize the second energy level component to analyze the output values from each of the second VAD and the second frame energy component in order to calculate ambient-energy values at the electronic device. For example, based on the output value from the second VAD indicating that the second frame does not represent user speech, the second energy level component may calculate the second ambient-energy value by increasing the first ambient-energy value based on the second frame energy value. Additionally, for another example, based on the output value from the second VAD indicating that the second frame represents user speech, the second energy level component may calculate the second ambient-energy value by decreasing the first ambient-energy level based on the second frame energy value.

At 736, the process 700 outputs, using the second circuit 306, at least a portion of the audio signal and at 738, the process 700 outputs, using the second circuit 306, data indicating the second speech-energy value and the second ambient-energy value. For instance, the second circuit 306 may cause the electronic device to send at least a portion of the audio signal to a remote system. Additionally, the second circuit 306 may cause the electronic device to send the data representing the second speech-energy value and the second ambient-energy value to the remote system and/or an additional remote system. In response, the electronic device can receive data from the remote system that causes the electronic device to perform a function, such as output audio.

At 740, the process 700 switches the first circuit 304 from operating in the standby mode to operating in the active mode. For instance, the electronic device may not receive input, such as user speech, for a threshold period of time. Based on not receiving input, the electronic device may switch from operating in the active mode to operating in the standby mode. Additionally, the first circuit 304 may switch from operating in the standby mode to operating in the active mode.

At 742, the process 700 sends, using the second circuit 306, the second speech-energy value and the second ambient-energy value and at 744, the process 700 receives, using the first circuit 304, the second speech-energy value and the second ambient-energy value. For instance, based on the electronic device switching from the active mode to the standby mode, the second circuit 306 sends the first circuit 304 the second speech-energy value and the second ambient-energy value.

At 746, the process 700 switches the second circuit 306 from operating in the active mode to operating in the standby mode. For instance, based on the electronic device switching from operating in the active mode to operating in the standby mode, the second circuit 306 can also switch to the standby mode in order to save power on the electronic device.

At 748, the process 700 continues, using the first circuit 304, to determine speech-energy values and ambient-energy values. For instance, the first circuit 304 can once again start receiving and processing the audio signal. Additionally, while the electronic device and/or the second circuit 306 are operating in the standby mode, the first circuit 304 can continue to analyze frames of the audio signal to determine whether each frame represents user speech and determine a respective frame energy associated with each frame. Furthermore, the first circuit 304 can use such determinations to continue to determine new speech-energy values and new ambient-energy values. In some instances, the first circuit 304 uses the second speech-energy value and the second ambient-energy value as initial energy values.

Figure 8:
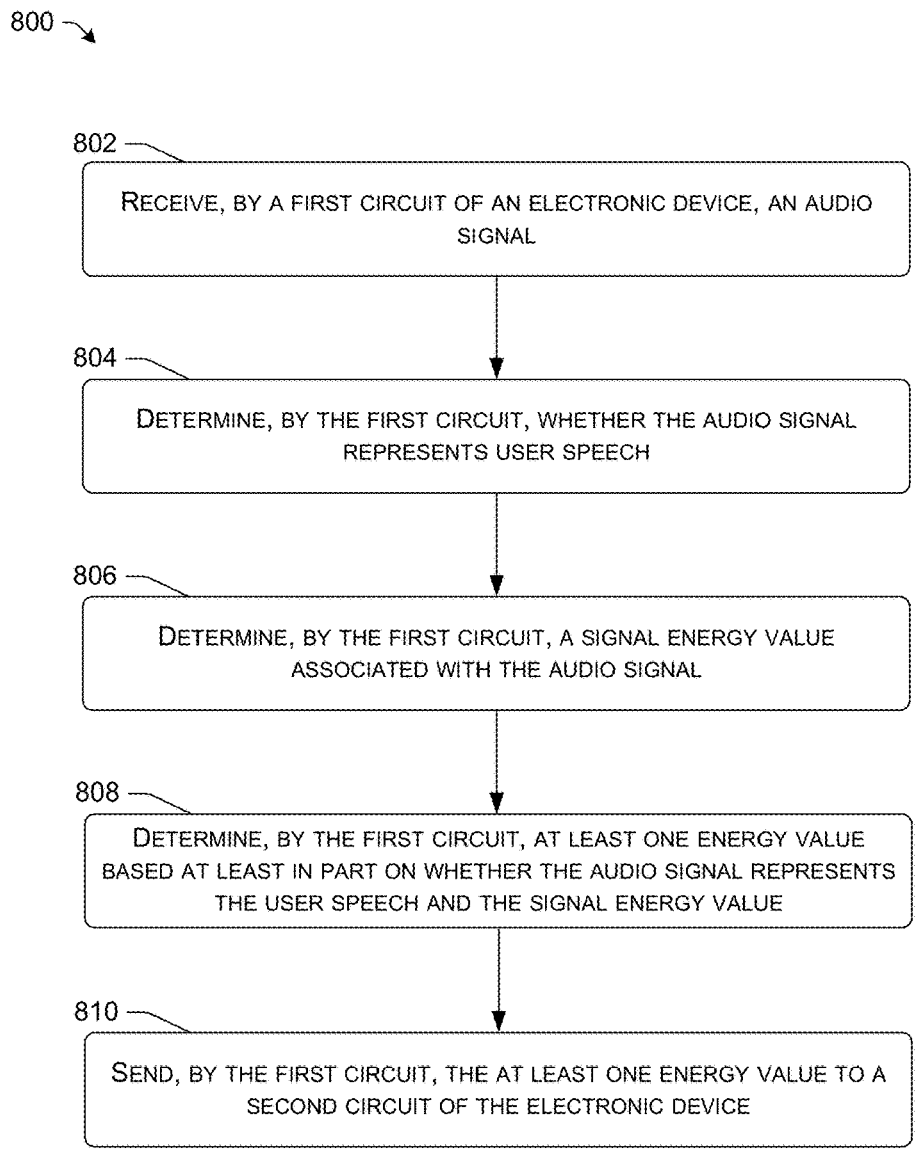
FIG. 8 illustrates an example process of an electronic device determining energy levels while operating in a standby mode.

FIG. 8 illustrates an example process 800 of an electronic device determining energy levels while operating in a standby mode. At 802, the process 800 receives, by a first circuit of an electronic device, an audio signal. For instance, the electronic device may be operating in a standby mode in order to save power consumption of the electronic device. The first circuit may include low-power circuit that continues to operate while the electronic device is operating in the standby mode. As such, the first circuit may receive audio signals generated by at least one microphone of the electronic device. In some instances, the first circuit may process the audio signals.

At 804, the process 800 determines, by the first circuit, whether the audio signal represents user speech and at 806 the process 800 determines, by the first circuit, a signal energy value associated with the audio signal. For instance, the first circuit may analyze frames of the audio signal to determine whether each frame represents user speech and determine a respective signal energy value associated with each frame. At 808, the process 800 then determines, by the first circuit, at least one energy value based at least in part on whether the audio signal represents user speech and the signal energy value. In some instances, the at least one energy value can include a speech-energy value and an ambient-energy value.

At 810, the process 800 sends, by the first circuit, the at least one energy value to a second circuit of the electronic device. For instance, the electronic device and/or the second circuit may switch from operating in a standby mode to operating in an active mode. Based on the switch in operation, the first circuit may send the at least one energy level to the second circuit so that the second circuit can use the at least one energy value to continue to calculate energy values at the electronic device. For instance, the second circuit can use a current speech-energy value and a current ambient-energy value to continue to calculate speech-energy values and ambient-energy values at the electronic device.

Figure 9:
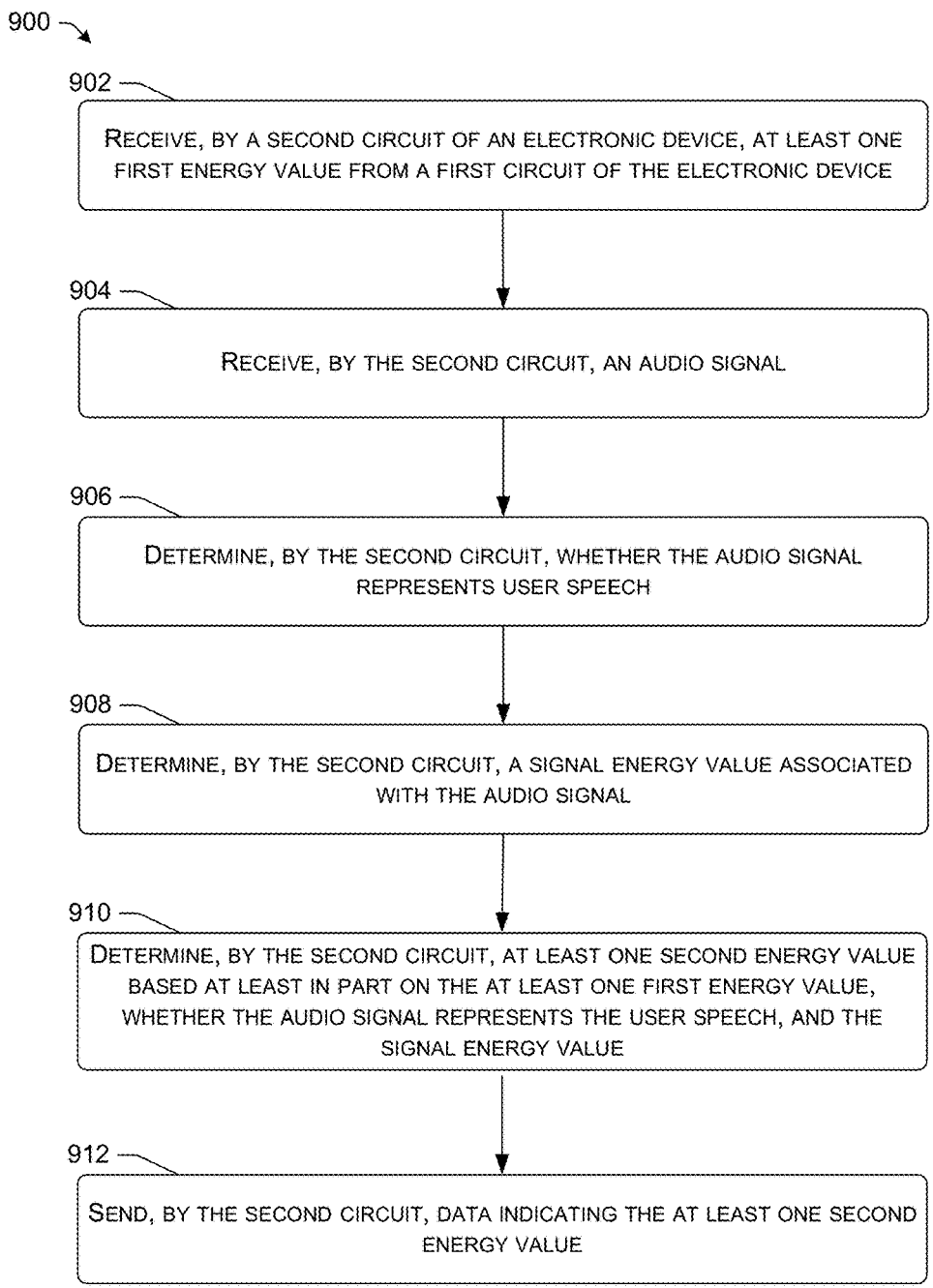
FIG. 9 illustrates an example process of an electronic device determining energy levels while operating in an active mode.

FIG. 9 illustrates an example process 900 of an electronic device determining energy values while operating in an active mode. In some instances, the process 900 may occur directly after the process 800. For instance, at 902, the process 900 receives, by a second circuit of an electronic device, at least one first energy value from a first circuit of the electronic device. For instance, as discussed above, the first circuit may send the at least one energy level to the second circuit based on the electronic device and/or the second circuit switching from operating in the standby mode to operating in the active mode. In some instances, if the switch in the mode of operating is caused by a detection of a wakeword, the second circuit may send data indicating the at least one first energy value to a remote system. In some instances, the at least one first energy value includes a first speech-energy value and a first ambient-energy value At 904, process 900 receives, by the second circuit, an audio signal. For instance, the electronic device may be operating in the active mode. While operating in the active mode, an at 906, the process 900 determines, by the second circuit, whether the audio signal represents user speech. Additionally, at 908, the process 900 determines, by the second circuit, a signal energy value associated with the audio signal. For instance, the second circuit may analyze frames of the audio signal to determine whether each frame represents user speech. Additionally, the second circuit may analyze the frames of the audio signal to determine a respective frame energy value associated with each frame.

At 910, the process 900 determines, by the second circuit, at least one second energy value based at least in part on the at least one first energy value, whether the audio signal represents user speech, and the signal energy value. For instance, the second circuit may determine a second speech-energy value and a second ambient-energy value. For example, based determining that the audio signal does not represent user speech, the second circuit may calculate the second speech-energy value by reducing the first speech-energy value based on the frame energy value. Additionally, for a second example, based on determining that the audio signal represents user speech, the second circuit may calculate the second speech-energy value by increasing the first speech-energy value based on the frame energy value.

For a third example, based on determining that the audio signal does not represent use speech, the second circuit may calculate the second ambient-energy value by increasing the first ambient-energy value based on the frame energy value. Additionally, for a fourth example, based on determining that the audio signal represents user speech, the second circuit may calculate the second ambient-energy value by decreasing the first ambient-energy value based on the frame energy value.

At 912, the process 900 sends, by the second circuit, data indicating the at least one second energy level. For instance, the second circuit may cause the electronic device to output data indicating the second speech-energy value and the second ambient-energy value to a remote system that performs arbitration. In some instances, the second circuit further causes the electronic device to output at least a portion of the audio signal to the remote system and/or an additional remote system for processing. In response, the electronic device may receive, from the remote system and/or the additional remote system, additional data that represents audible output to be output by the electronic device.

It is noted that, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. An electronic device that determines energy values for input audio in a dual stage wakeword detection architecture, the electronic device comprising:
   a microphone operable to generate audio data representing user speech;
   a first circuit comprising:
   a first voice-activity detector operable to:
      receive a first portion of the audio data; and
      analyze the first portion of the audio data to determine that the first portion of the audio data represents a first portion the user speech;

a first frame-energy component operable to:
  receive the first portion of the audio data; and
  determine a first frame energy value associated with the first portion of the audio data;
a first energy-level component operable to:
  determine a first speech-energy value and a first ambient-energy value based at least in part the first portion of the audio data representing the first portion of the user speech and the first frame energy value; and
  send, to a second circuit, and based at least in part on the electronic device switching from operating in the standby mode to operating in the active mode, the first speech-energy value and the first ambient-energy value; and
the second circuit comprising:
a second voice-activity detector operable to:
  receive a second portion of the audio data; and
  determine that the second portion of the audio data represents a second portion of the user speech;
a second frame-energy component operable to:
  receive the second portion of the audio data; and
  determine a second frame energy value associated with the second portion of the audio data; and
a second energy-level component operable to:
  determine a second speech-energy value by increasing the first speech-energy value based at least in part on the second portion of the audio data representing the second portion of the user speech;
  determine a second ambient-energy value by decreasing the first ambient-energy value based at least in part on the second frame energy value,
wherein the second circuit utilizes more power to operate than power used to operate the first circuit.

2. The electronic device as recited in claim 1, wherein the first circuit further comprises:
a wakeword detection component operable to:
  receive the first portion of the audio data;
  determine that the first portion of the audio data represents a wakeword; and
  cause the second circuit to switch from operating in a standby mode to operating in an active mode; and
a memory buffer operable to:
  receive the first portion of the audio data;
  store the first portion of the audio data; and
  send the first portion of the audio data to the second circuit.

3. The electronic device as recited in claim 1, wherein the second energy-level component is further configured to send, to the first circuit, the second ambient-energy value and the second speech-energy value based at least in part on the electronic device switching from operating in the active mode to operating in the standby mode.

4. An electronic device comprising:
at least one microphone operable to generate audio data;
a first circuit operable to:
  receive a first portion of the audio data;
  determine that the first portion of the audio data represents user speech;
  determine a signal energy value associated with the first portion of the audio data;
  determine a first speech-energy value based at least in part on the first portion of the audio data representing the user speech;
  determine an ambient-energy value based at least in part on the signal energy value;
  send the first speech-energy value to a second circuit; and
  send the ambient-energy value to the second circuit;
the second circuit operable to:
  receive the first speech-energy value from the first circuit;
  receive the ambient-energy value from the first circuit; and
  determine a second speech-energy value based at least in part on the first speech-energy value and a second portion of the audio data; and
a network interface operable to send, to one or more remote computing devices, at least the second portion of the audio data.

5. The electronic device as recited in claim 4, wherein the first circuit is further operable to:
determine that the first portion of the audio data represents a wakeword;
cause the second circuit to switch from operating in a first mode to operating in a second mode; and
send the first portion of the audio data to the second circuit.

6. The electronic device as recited in claim 5 wherein:
the second circuit is further operable to determine that the first portion of the audio data represents the wakeword; and
the network interface is further operable to:
  send, to the one or more remote computing devices, data representing at least one of the first speech-energy value or the second speech-energy value; and
  send, to the one or more remote computing devices, data representing the ambient-energy value.

7. The electronic device as recited in claim 4, further comprising:
an input device operable to receive input,
and wherein the second circuit is further operable to switch from operating in a first mode to operating in a second mode based at least in part the input device receiving the input,
wherein the second circuit receives the first speech-energy value and receives the ambient-energy value based at least in part on the second circuit switching from operating in the first mode to operating in the second mode.

8. The electronic device as recited in claim 4, wherein the user speech comprises first user speech, the signal energy value comprises a first signal energy value, and the ambient-energy value comprises a first ambient-energy value, and wherein the second circuit is further operable to:
receive the second portion of the audio data;
determine that the second portion of the audio data represents second user speech;
determine a second signal energy value associated with the second portion of the audio data; and
determine a second ambient-energy value based at least in part on the first ambient-energy value and the second signal energy value.

9. The electronic device as recited in claim 8, wherein the network interface is further operable to:
send, to the one or more remote computing devices, data representing the second speech-energy value; and
send, to the one or more remote computing devices, data representing the second ambient-energy value.

10. The electronic device as recited in claim 8, wherein the second circuit is further operable to:

determine that the electronic device is switching from operating in an active mode to operating in a standby mode;

send the second speech-energy value to the first circuit;

send the second ambient-energy value to the first circuit; and switch from operating in a first mode to operating in a second mode.

11. The electronic device as recited in claim 4, wherein the second circuit is further operable to:

receive the second portion of the audio data from the first circuit; and receive, from the first circuit, data indicating that the first circuit finished analyzing the first portion of the audio data.

12. The electronic device as recited in claim 4, wherein:

the second circuit receives the first speech-energy value and receives the ambient-energy value based at least in part on the electronic device switching from operating in a standby mode to operating in an active mode; and the first circuit is further operable to switch from operating in a first mode to operating in a second mode based at least in part on the electronic device switching from operating in the standby mode to operating in the active mode.

13. A method comprising:

determining, by a first circuit, a first speech-energy value associated with at least a first portion of audio data;

determining, by the first circuit, a first ambient-energy value associated with at least the first portion of the audio data;

receiving, by a second circuit, the first speech-energy value from the first circuit;

receiving, by the second circuit, the first ambient-energy value from the first circuit;

receiving, by the second circuit, at least a second portion of the audio data;

determining, by the second circuit, that the second portion of the audio data represents user speech;

determining, by the second circuit, a signal energy value associated with the second portion of the audio data;

determining, by the second circuit, a second speech-energy value based at least in part on the first speech-energy value and the second portion of the audio data representing user speech;

determining, by the second circuit, a second ambient-energy value based at least in part on the first ambient-energy value and the signal energy value; and sending, to one or more remote computing devices, at least the second portion of the audio data.

14. The method as recited in claim 13, further comprising:

receiving, by the first circuit, the second portion of the audio data from one or more microphones;

determining, by the first circuit, that the second portion of the audio data represents a wakeword;

causing, by the first circuit, and based at least in part on the second portion of the audio data representing the wakeword, the second circuit to switch from operating in a standby mode to operating in an active mode; and sending, by the first circuit, at least the second portion of the audio data to the second circuit.

15. The method as recited in claim 14, further comprising:

determining, by the second circuit, that the second portion of the audio data represents the wakeword;

sending, to the one or more remote computing devices, data representing the first speech-energy value; and sending, to the one or more remote computing devices, data representing the first ambient-energy value.

16. The method as recited in claim 13, further comprising:

receiving input via an input device; and causing, based at least in part on receiving the input, the second circuit to switch from operating in a first mode to operating in a second mode, wherein receiving the first speech-energy value and receiving the first ambient-energy value by the second circuit is based at least in part on the second circuit switching from operating in the first mode to operating in the second mode.

17. The method as recited in claim 13, further comprising:

sending, to the one or more remote computing devices, data representing the second speech-energy value; and sending, to the one or more remote computing devices, data representing the second ambient-energy value.

18. The method as recited in claim 13, wherein the user speech comprises first user speech and the signal energy value comprises a first signal energy value, and wherein the method further comprises:

determining, by the first circuit, that the first portion of the audio data represents second user speech;

determining, by the first circuit, a second signal energy value associated with the first portion of the audio data;

determining, by the first circuit, the first speech-energy value based at least in part on the first portion of the audio data representing the second user speech; and determining, by the first circuit, the first ambient-energy value based at least in part on the first portion of the audio data representing the second user speech and the second signal energy value.

19. The method as recited in claim 13, further comprising:

causing the second circuit to switch from operating in a first mode to operating in a second mode; and receiving, the by first circuit, and based at least in part on the second circuit switching from operating in the first mode to operating in the second mode, the second speech-energy value and the second ambient-energy value.

20. The method as recited in claim 13, further comprising:

sending, to the one or more remote computing devices, data representing the second speech-energy value;

sending, to the one or more remote computing devices, data representing the second ambient-energy value;

receiving, from the one or more remote computing devices, additional audio data that is associated with the audio data.

* * * * *